US012603413B2

(12) United States Patent
Cho et al.

(10) Patent No.:  US 12,603,413 B2
(45) Date of Patent:       Apr. 14, 2026

(54) ELECTRONIC APPARATUS INCLUDING ANTENNA

(71) Applicant: SAMSUNG ELECTRONICS CO., LTD., Suwon-si (KR)

(72) Inventors: Youngjun Cho, Suwon-si (KR); Seongyong An, Suwon-si (KR); Sangha Lee, Suwon-si (KR); Yoonjae Lee, Suwon-si (KR); Jinwoo Jung, Suwon-si (KR); Jaebong Chun, Suwon-si (KR); Sangmin Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 307 days.

(21) Appl. No.: 18/318,445

(22) Filed: May 16, 2023

(65) Prior Publication Data

US 2023/0307820 A1     Sep. 28, 2023

Related U.S. Application Data

(63) Continuation of application No. PCT/KR2021/016744, filed on Nov. 16, 2021.

(30) Foreign Application Priority Data

Nov. 16, 2020   (KR) ........................ 10-2020-0152870
Apr. 2, 2021   (KR) ........................ 10-2021-0043169

(51) Int. Cl.
  *H01Q 1/24*        (2006.01)
  *H01Q 1/50*        (2006.01)
  *H04M 1/02*        (2006.01)
(52) U.S. Cl.
  CPC .............. *H01Q 1/243* (2013.01); *H01Q 1/50* (2013.01); *H04M 1/0237* (2013.01)

(58) Field of Classification Search
  CPC ........ H01Q 1/243; H01Q 1/50; H01Q 1/0237; H01Q 1/0268; H01Q 1/026
  See application file for complete search history.

(56) References Cited

U.S. PATENT DOCUMENTS

2004/0219956 A1 *  11/2004  Iwai ........................ H01Q 5/00
                                                          455/575.3
2008/0106477 A1    5/2008   Mashima et al.
                      (Continued)

FOREIGN PATENT DOCUMENTS

CN        110312030 A     10/2019
JP      2006014128 A      1/2006
                (Continued)

OTHER PUBLICATIONS

International Search Report for PCT/KR2021/016744 mailed Mar. 2, 2022, 4 pages.
                (Continued)

*Primary Examiner* — David Tung
(74) *Attorney, Agent, or Firm* — Nixon & Vanderhye P.C.

(57)              ABSTRACT

According to various embodiments disclosed herein, an electronic apparatus comprises: a first housing including a first metal area and a first non-metal area; a second housing configured to accommodate at least a portion of the first housing and to guide a slide movement of the first housing, the second housing including a second metal area and a second non-metal area; and a display including a first display region connected with the first housing and a second display region extending from the first display region. In a state in which the first housing is accommodated in the second housing, the first metal area may face at least a portion of the second non-metal area, and the first non-metal area may face at least a portion of the second metal area.

15 Claims, 16 Drawing Sheets

(56)           References Cited

U.S. PATENT DOCUMENTS

| | | | | |
|---|---|---|---|---|
| 2009/0066585 | A1* | 3/2009 | Sato | H01Q 9/16 |
| | | | | 343/702 |
| 2009/0233657 | A1* | 9/2009 | Ogawa | H01Q 9/16 |
| | | | | 455/575.3 |
| 2009/0305755 | A1* | 12/2009 | Lee | H01Q 1/243 |
| | | | | 343/702 |
| 2010/0227657 | A1* | 9/2010 | Mashima | H01Q 9/0442 |
| | | | | 455/575.4 |
| 2014/0240178 | A1 | 8/2014 | Chun et al. | |
| 2014/0266926 | A1* | 9/2014 | Merz | H01Q 9/0421 |
| | | | | 343/702 |
| 2017/0142241 | A1 | 5/2017 | Kim et al. | |
| 2019/0103656 | A1 | 4/2019 | Shi et al. | |
| 2019/0261519 | A1* | 8/2019 | Park | G06F 1/1652 |
| 2020/0333855 | A1 | 10/2020 | Kim et al. | |
| 2020/0350939 | A1 | 11/2020 | Lee et al. | |
| 2021/0135492 | A1 | 5/2021 | Kim et al. | |
| 2021/0219437 | A1 | 7/2021 | Kim et al. | |
| 2021/0336356 | A1* | 10/2021 | Choi | G06F 1/1652 |
| 2021/0337054 | A1* | 10/2021 | Choi | H01Q 5/20 |

FOREIGN PATENT DOCUMENTS

| | | |
|---|---|---|
| JP | 2006324805 A | 11/2006 |
| KR | 20140105886 A | 9/2014 |
| KR | 20170056292 A | 5/2017 |
| KR | 20190101184 A | 8/2019 |
| KR | 20190115888 A | 10/2019 |
| KR | 20190143029 A | 12/2019 |
| KR | 20200031607 A | 3/2020 |
| KR | 20200117959 A | 10/2020 |
| KR | 20200121518 A | 10/2020 |

OTHER PUBLICATIONS

Written Opinion of the ISA for PCT/KR2021/016744 mailed Mar. 2, 2022, 3 pages.

* cited by examiner

ELECTRONIC APPARATUS INCLUDING ANTENNA

CROSS-REFERENCE TO RELATED APPLICATIONS

This application is a continuation of International Application No. PCT/KR2021/016744 designating the United States, filed on Nov. 16, 2021, in the Korean Intellectual Property Receiving Office and claiming priority to Korean Patent Application No. 10-2020-0152870, filed on Nov. 16, 2020, in the Korean Intellectual Property Office, and to Korean Patent Application No. 10-2021-0043169, filed on Apr. 2, 2021, in the Korean Intellectual Property Office, the disclosures of all of which are incorporated by reference herein in their entireties.

BACKGROUND

Field

The disclosure relates to an electronic device including an antenna.

Description of Related Art

With the development of information and communication technology and semiconductor technology, various functions are being integrated into one portable electronic device. For example, an electronic device may implement not only communication functions but also entertainment functions, such as playing games, multimedia functions, such as playing music and videos, communication and security functions for mobile banking, and scheduling or e-wallet functions. Such electronic devices become compact enough for users to carry in a convenient way.

As mobile communication services extend up to multimedia service sectors, the display of the electronic device may be increased to allow the user satisfactory use of multimedia services as well as voice call or text messaging services. This, however, trades off the trend of electronic devices being compact.

An electronic device (e.g., a portable terminal) may include a display with a flat surface or both a flat and curved surface. An electronic device including a display may have a limitation in realizing a screen larger than the size of the electronic device due to the fixed display structure. Accordingly, research has been conducted on electronic devices including a foldable or rollable display.

In an electronic device in which at least a portion of the display is rollable, the structures of the electronic device may move (e.g., slide) relative to each other. For example, the first housing having at least a portion that functions as an antenna, may slide relative to the second housing. In the closed state of the electronic device, a sidewall of the second housing may cover a portion of the first housing.

However, when the sidewall of the second housing covering the portion of the first housing is formed of metal, the performance of the antenna (e.g., metal area) using at least a portion of the first housing as an antenna radiator in the closed state of the electronic device may be lowered due to the sidewall of the second housing. Further, when the sidewall of the second housing is formed of a resin material which is a non-conductive member, durability of the electronic device may deteriorate.

SUMMARY

Embodiments of the disclosure provide an electronic device including a second housing configured to reduce interference with signals transmitted from the first housing and to reduce deterioration of durability of the electronic device.

Embodiments of the disclosure provide an electronic device that may use at least one of the first housing or the second housing selectively or together, as an antenna radiator.

The disclosure is not limited to the various example embodiments but various modifications or changes may rather be made thereto without departing from the spirit and scope of the disclosure.

According to various example embodiments of the disclosure, an electronic device may comprise: a first housing including a first metal area and a first non-metal area, a second housing configured to accommodate at least a portion of the first housing and to guide a slide movement of the first housing, the second housing including a second metal area and a second non-metal area, and a display including a first display area connected with the first housing and a second display area extending from the first display area. The first metal area may face at least a portion of the second non-metal area, and the first non-metal area may face at least a portion of the second metal area in a state in which the first housing is accommodated in the second housing.

According to various example embodiments of the disclosure, an electronic device may comprise: a first housing including a first metal area and a first non-metal area, a second housing configured to accommodate at least a portion of the first housing and to guide a slide movement of the first housing, the second housing including a second metal area and a second non-metal area, a display including a first display area connected with the first housing and a second display area extending from the first display area, and a communication module comprising communication circuitry configured to transmit and/or receive a signal using at least one of the first metal area or the second metal area. At least a portion of the second metal area may be configured to cover at least a portion of the first non-metal area, and at least a portion of the second non-metal area may be configured to cover at least a portion of the first metal area.

According to various example embodiments of the disclosure, in the electronic device, the first housing and the second housing may include a metal area and a non-metal area. In the closed state of the electronic device, the performance deterioration of the antenna that uses at least a portion of the metal area of the first housing as an antenna radiator may be reduced. As a portion of the second housing includes metal, the durability of the electronic device may be enhanced.

According to various example embodiments of the disclosure, the electronic device may use at least one of the first housing or the second housing as an antenna. As the housing used as an antenna is changed depending on the frequency band, the antenna performance may be enhanced.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
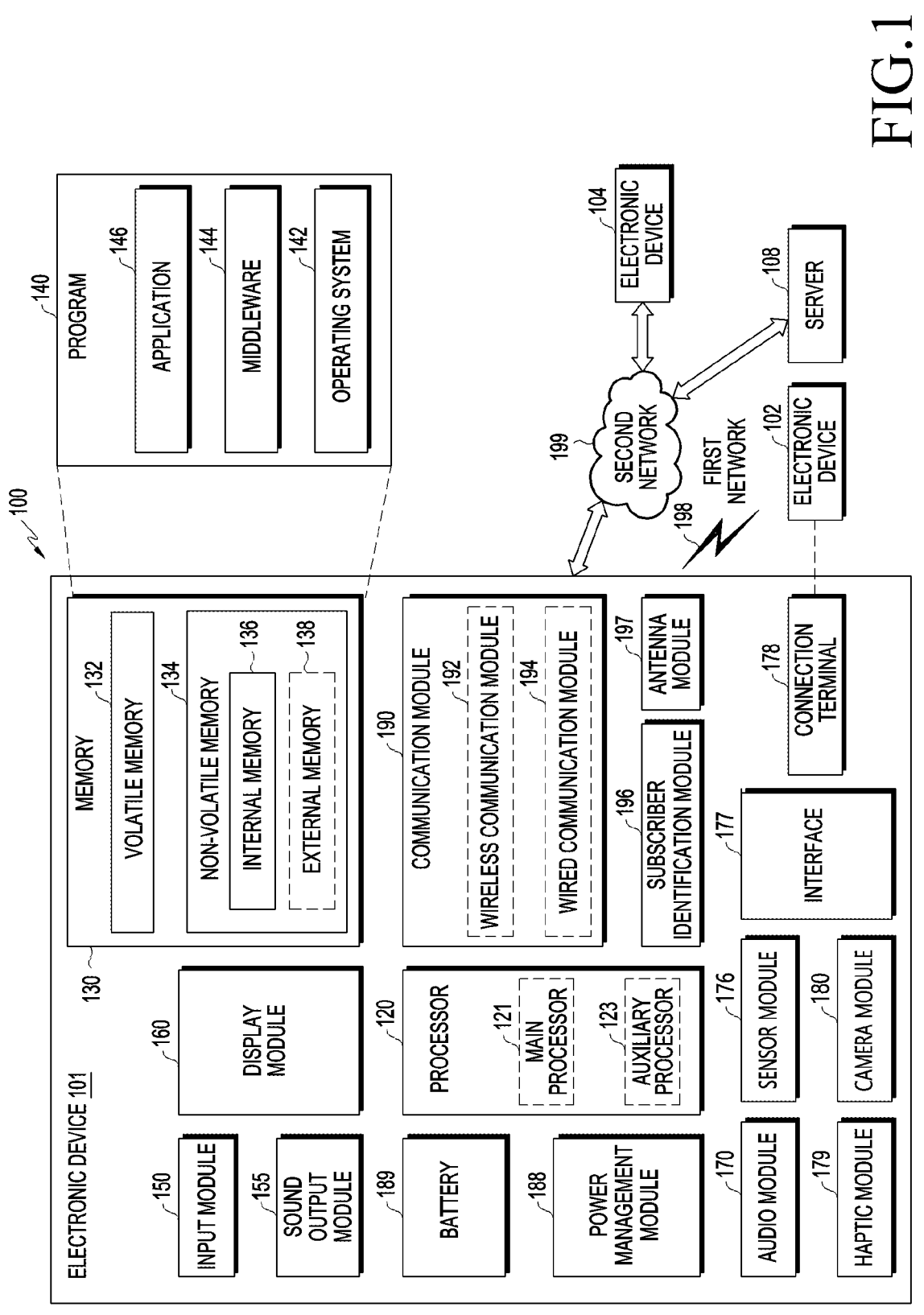
FIG. 1 is a block diagram illustrating an example electronic device in a network environment according to various embodiments.

FIG. 1 is a block diagram illustrating an example electronic device in a network environment according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device). According to an embodiment, the antenna module may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
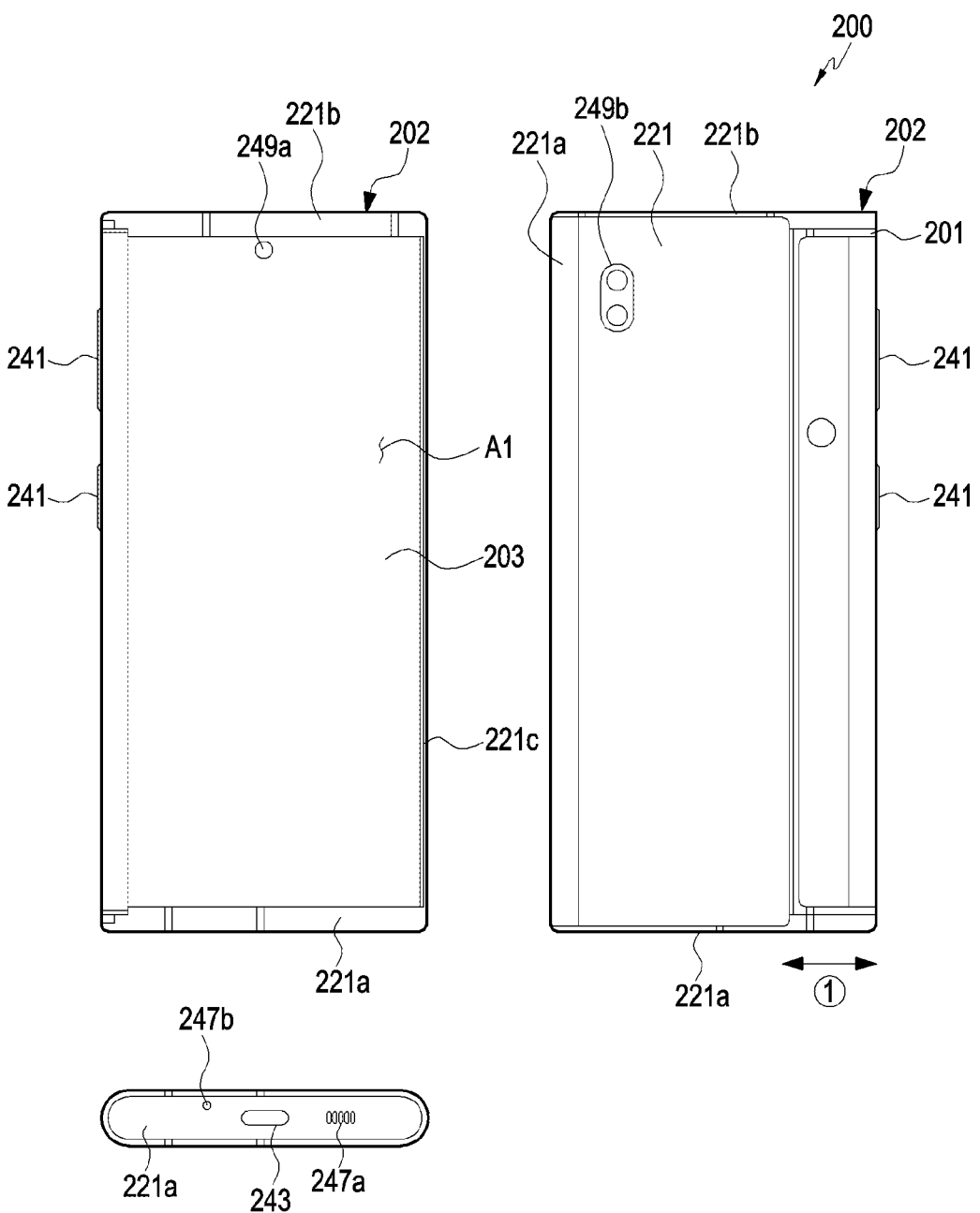
FIG. 2 is a diagram illustrating an example electronic device in a state in which a second display area of a flexible display is accommodated in a second housing, according to various embodiments.
Figure 3:
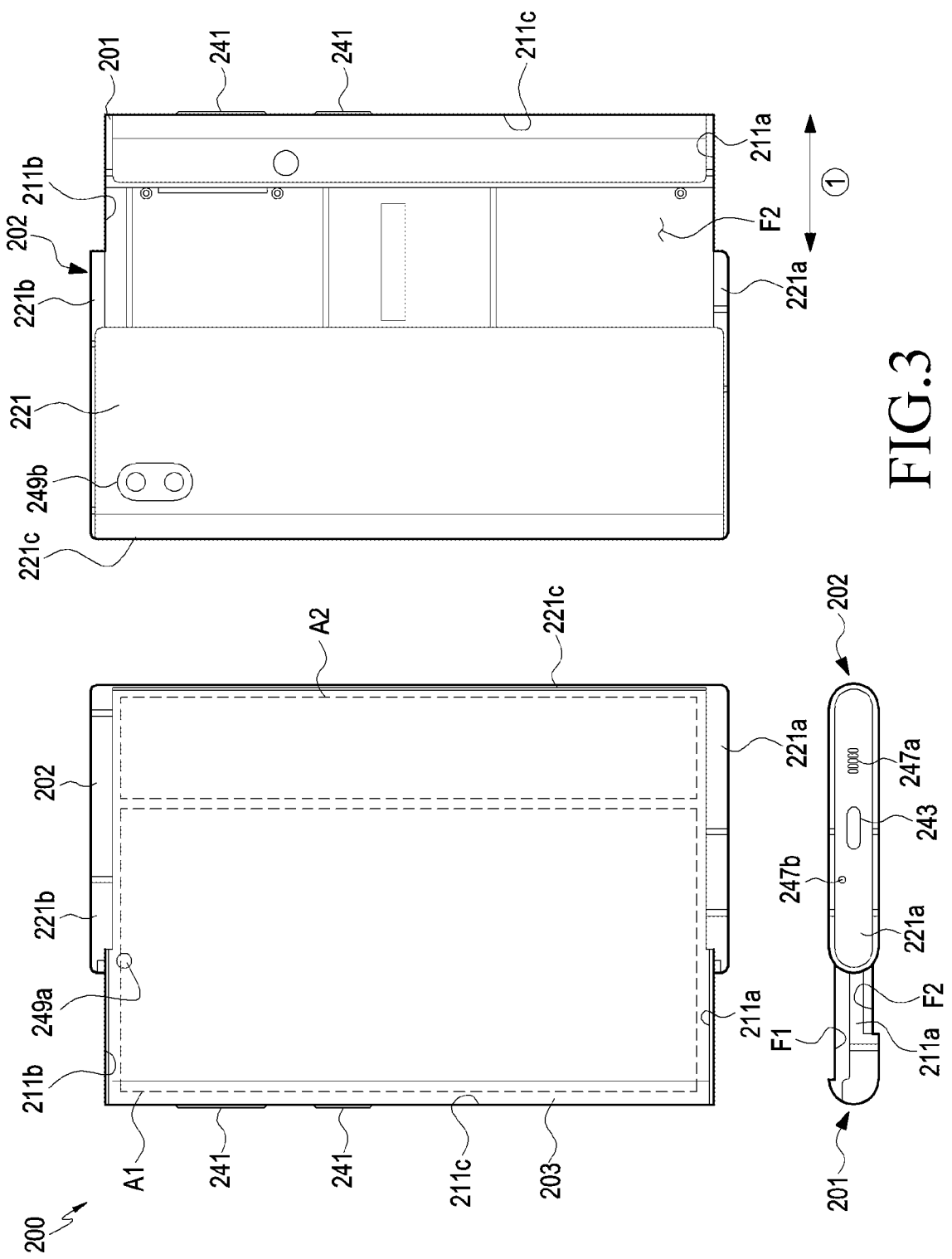
FIG. 3 is a diagram illustrating an example electronic device in a state in which a second display area of a display is exposed (e.g., visible) to the outside of a second housing, according to various embodiments.

FIG. 2 is a diagram illustrating a state in which a second display area of a flexible display is accommodated in a second housing, according to various embodiments. FIG. 3 is a diagram illustrating a state in which a second display area of a display is exposed (e.g., visible) to the outside of a second housing, according to various embodiments.

The state shown in FIG. 2 may illustrate a first housing 201 being closed with respect to a second housing 202, and the state shown in FIG. 3 may illustrate the first housing 201 being open with respect to the second housing 202. According to an embodiment, the "closed state" or "opened state" may be referred to as a closed or open state of the electronic device.

Referring to FIGS. 2 and 3, the electronic device 200 may include housings 201 and 202. The housings 201 and 202 may include a second housing 202 and a first housing 201 movably disposed with respect to the second housing 202. According to an embodiment, the electronic device 200 may be interpreted as having a structure in which the second housing 202 is slidably disposed on the first housing 201. According to an embodiment, the first housing 201 may be disposed to perform reciprocating motion by a predetermined distance in a predetermined direction with respect to the second housing 202, for example, a direction indicated by an arrow ①. The configuration of the electronic device 200 of FIGS. 2 and 3 may be the same as or similar in whole or in part to the configuration of the electronic device 101 of FIG. 1.

According to various embodiments, the first housing 201 may be referred to as, for example, a first structure, a slide unit, or a slide housing, and may be disposed to reciprocate on the second housing 202. According to an embodiment, the first housing 201 may receive various electrical and electronic components, such as a main circuit board or a battery. According to an embodiment, the second housing 202 may be referred to as, e.g., a second structure, a main part, or a main housing. The second housing 202 may receive at least a portion of the first housing 201 and may guide the slide movement of the first housing 201. A portion (e.g., the first display area A1) of the display 203 may be seated on the first housing 201. According to an embodiment, another portion (e.g., the second display area A2) of the display 203 may be accommodated into the inside of the second housing 202 (e.g., a slide-in motion) or be exposed (e.g., visible) to the outside of the second housing 202 (e.g., a slide-out motion) as the first housing 201 moves (e.g., slides) with respect to the second housing 202. As used herein with reference to the display of the electronic device, the terms "expose", "visually exposed" and "visible" may be used interchangeably to indicate that at least a portion of a display is visible outside of a housing and includes a display having a cover glass, cover plate, protective film, or the like.

According to various embodiments, the first housing 201 may include a first support surface F1 capable of supporting at least a portion (e.g., the first display area A1) of the display 203 and a first support surface F2 facing in a direction opposite to the first support surface F1.

Figure 4:
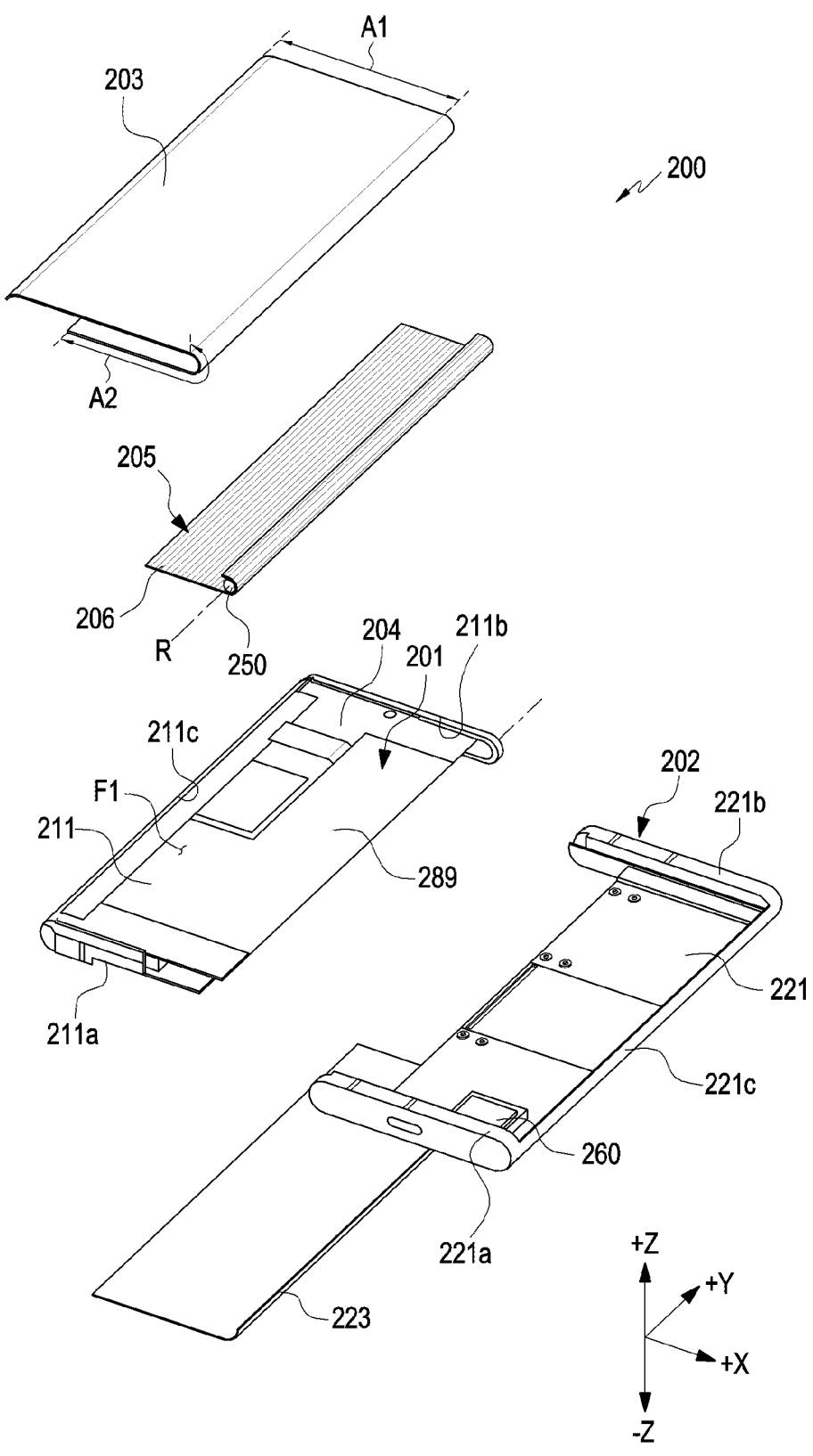
FIG. 4 is an exploded perspective view illustrating an electronic device according to various embodiments.

According to various embodiments, the first housing 201 may include first sidewalls 211a, 211b, and 211c extending from the first supporting member (e.g., the first supporting member 211 of FIG. 4). The first sidewalls 211a, 211b, and 211c may include a 1-1th sidewall 211a, a 1-2th sidewall 211b extending from the first supporting member 211 and opposite to the 1-1th sidewall 211a and a 1-3th sidewall 211c extending from the 1-1th sidewall 211a to the 1-2th sidewall 211b. According to an embodiment, the 1-3th sidewall 211c may be substantially perpendicular to the 1-1th sidewall 211a and/or the 1-2th sidewall 211b. According to an embodiment, in the closed state (e.g., FIG. 2) of the electronic device 200, the 1-1th sidewall 211a may face the 2-1th sidewall 221a of the second housing 202, and the 1-2th sidewall 211b may face the 2-2th sidewall 221b of the second housing 202. According to an embodiment, the first supporting member 211, the 1-1th sidewall 211a, the 1-2th sidewall 211b, and/or the 1-3th sidewall 211c may be integrally formed. According to an embodiment, the first supporting member 211, the 1-1th sidewall 211a, the 1-2th sidewall 211b, and/or the 1-3th sidewall 211c may be formed as separate housings and be combined or assembled.

According to various embodiments, the second housing 202 may include second sidewalls 221a, 221b, and 221c extending from the second supporting member (e.g., the second supporting member 221 of FIG. 4). The second sidewalls 221a, 221b, and 221c may include a 2-1th sidewall 221a, a 2-2th sidewall 221b extending from the second supporting member 221 and opposite to the 2-1th sidewall 221a and a 2-3th sidewall 221c extending from the 2-1th sidewall 221a to the 2-2th sidewall 221b. According to an embodiment, the 2-3th sidewall 221c may be substantially perpendicular to the 2-1th sidewall 221a and/or the 2-2th sidewall 221b. According to an embodiment, the 2-1th sidewall 221a may face the 1-1th sidewall 211a, and the 2-2th sidewall 221b may face the 1-2th sidewall 211b. For example, in the closed state (e.g., FIG. 2) of the electronic device 200, the 2-1th sidewall 221a may cover at least a portion of the 1-1th sidewall 211a, and the 2-2th sidewall 221b may cover at least a portion of the 1-2th sidewall 211b.

According to various embodiments, the 2-1th sidewall 221a, the 2-2nd sidewall 221b, and the 2-3th sidewall 221c may be formed to have an opening in one surface (e.g., the front surface) to receive at least a portion of the first housing 201. For example, the first housing 201 may be connected to the second housing 202 in a state in which it is at least partially surrounded, and the first housing 201 may be slide in a direction parallel to the first support surface F1 or the second support surface F2, for example, direction ① indicated with the arrow. According to an embodiment, the second supporting member 221, the 2-1th sidewall 221a, the 2-2th sidewall 221b, and/or the 2-3th sidewall 221c may be integrally formed. According to an embodiment, the second supporting member 221, the 2-1th sidewall 221a, the 2-2th sidewall 221b, and/or the 2-3th sidewall 221c may be formed as separate housings and be combined or assembled.

According to various embodiments, the second supporting member 221 and/or the 2-3th sidewall 221c may cover at least a portion of the flexible display 203. For example, at least a portion of the flexible display 203 may be accommodated in the second housing 202. The second supporting member 221 and/or the 2-3th sidewall 221c may cover a portion of the flexible display 203 accommodated in the second housing 202.

According to various embodiments, the electronic device 200 may include a display 203. For example, the display 203 may include a flexible display or a rollable display. For example, at least a portion of the display 203 may slide based on a slide movement of the first housing 201. According to an embodiment, the display 203 may include, or be disposed adjacent to, a touch detection circuit, a pressure sensor capable of measuring the intensity (pressure) of a touch, and/or a digitizer that detects a magnetic field-type stylus pen. The configuration of the display 203 of FIGS. 2 and 3 may be the same as or similar in whole or part to the configuration of the display module 160 of FIG. 1.

According to various embodiments, the display 203 may include a first display area A1 and a second display area A2. According to an embodiment, at least a portion of the first display area A1 may be disposed on the first housing 201. For example, at least a portion of the first display area A1 may be disposed on the first support surface F1 of the first housing 201 and, together with the first housing 201, slide based on a slide movement of the first housing 201. For example, the first display area A1 may be an area that is always visible from the outside. According to an embodiment, the first display area A1 may be interpreted as an area that cannot be positioned inside the second housing 202. The second display area A2 may extend from the first display area A1 and, as the first housing 201 slides, the second display area A2 may be inserted or accommodated in the second housing 202 (e.g., structure) or exposed to the outside of the second housing 202. According to an embodiment (not shown), at least a portion of the first display area A1 may be supported by the second housing 202.

According to various embodiments, the second display area A2 may be substantially moved while being guided by a roller (e.g., the roller 250 of FIG. 4) mounted in the first housing 201 and may be thus accommodated in, or exposed to the outside of, the second housing 202 or a space formed between the first housing 201 and the second housing 202. According to an embodiment, the second display area A2 may move based on a slide movement of the first housing 201 in the first direction (e.g., the direction indicated by the arrow (0) of the first housing 201. For example, while the first housing 201 slides, a portion of the second display area A2 may be deformed into a curved shape in a position corresponding to the roller 250.

According to various embodiments, when viewed from above the first housing 201, if the first housing 201 moves from the closed state to the open state, the second display area A2 may be gradually exposed to the outside of the second housing 202 to be substantially coplanar with the first display area A1. In an embodiment, the second display area A2 may be at least partially accommodated inside the second housing 202, and a portion of the second display area A2 may be visually exposed to the outside even in the state shown in FIG. 2 (e.g., the closed state). According to an embodiment, a portion of the second display area A2 may maintain a curved shape in a position corresponding to the roller 250 regardless of the closed state or the opened state.

According to various embodiments, the electronic device 200 may include a key input device 241, a connector hole 243, audio modules 247a and 247b, or camera modules 249a and 249b. Although not shown, the electronic device 200 may further include an indicator (e.g., a light emitting diode (LED) device) or various sensor modules. The configuration of the audio module 247a and 247b and camera modules 249a and 249b of FIGS. 2 and 3 may be the same as or similar in whole or part to the configuration of the audio module 170 and the camera module 180 of FIG. 1.

According to various embodiments, the key input device 241 may be positioned in one area of the first housing 201. Depending on the appearance and the state of use, the electronic device 200 may be designed to omit the illustrated key input device 241 or to include additional key input device(s). According to an embodiment, the electronic device 200 may include a key input device (not shown), e.g., a home key button or a touchpad disposed around the home key button. According to an embodiment (not shown), at least a portion of the key input device 241 may be disposed on the second housing 202.

According to various embodiments, the connector hole 243 may be omitted or may receive a connector (e.g., a universal serial bus (USB) connector) for transmitting and receiving power and/or data with an external electronic device. Although not shown, the electronic device 200 may include a plurality of connector holes 243, and some of the plurality of connector holes 243 may function as connector holes for transmitting/receiving audio signals with an external electronic device. In the illustrated embodiment, the connector hole 243 is disposed in the 2-3th sidewall 123c, but the present disclosure is not limited thereto. The connector hole 243 or a connector hole not shown may be disposed in the 2-1th sidewall 221a or the 2-2th sidewall 221b.

According to various embodiments, the audio modules 247a and 247b may include at least one speaker hole 247a or at least one microphone hole 247b. One of the speaker holes 247a may be provided as an external speaker hole, and the other (not shown) may be provided as a receiver hole for voice calls. The electronic device 200 may include a microphone for obtaining sound. The microphone may obtain external sound of the electronic device 200 through the microphone hole 247b. According to an embodiment, the electronic device 200 may include a plurality of microphones to detect the direction of sound. According to an embodiment, the electronic device 200 may include an audio module in which the speaker hole 247a and the microphone hole 247b are implemented as one hole or may include a speaker without the speaker hole 247a (e.g., a piezo speaker).

According to various embodiments, the camera modules 249a and 249b may include a first camera module 249a and/or a second camera module 249b. The second camera module 249b may be positioned in the first housing 201 and may capture a subject in a direction opposite to the first display area A1 of the display 203. The electronic device 200 may include a plurality of camera modules 249a and 249b. For example, the electronic device 200 may include at least one of a wide-angle camera, a telephoto camera, or a close-up camera. According to an embodiment, the electronic device 200 may measure the distance to the subject by including an infrared projector and/or an infrared receiver. The camera modules 249a and 249b may include one or more lenses, an image sensor, and/or an image signal processor. The electronic device 200 may further include another camera module (first camera module 249a, e.g., a front camera) that captures a subject in a direction opposite to the display 203. For example, the first camera module 249a may be disposed in an area overlapping the display 203 or around the first display area A1 and, when disposed in the area overlapping the display 203, the first camera module 249a may capture the object through the display 203.

According to various embodiments, an indicator (not shown) of the electronic device 200 may be disposed on the first housing 201 or the second housing 202, and the indicator may include a light emitting diode to provide state information about the electronic device 200 as a visual signal. The sensor module (e.g., the sensor module 176 of FIG. 1) of the electronic device 200 may produce an electrical signal or data value corresponding to the internal operation state or external environment state of the electronic device. The sensor module may include, for example, a proximity sensor, a fingerprint sensor, or a biometric sensor (e.g., an iris/face recognition sensor or a heartrate monitor (HRM) sensor). In an embodiment, the electronic device 200 may include at least one of a gesture sensor, a gyro sensor, an atmospheric pressure sensor, a magnetic sensor, an accelerometer, a grip sensor, a color sensor, an infrared (IR) sensor, a temperature sensor, a humidity sensor, or an illuminance sensor.

FIG. 4 is an exploded perspective view illustrating an electronic device according to various embodiments.

Referring to FIG. 4, the electronic device 200 may include a first housing 201, a second housing 202, a display 203 (e.g., a flexible display, a foldable display, or a rollable display), a roller 250, or an articulated hinge structure 205. A portion (e.g., the second display area A2) of the display 203 may be accommodated in the electronic device 200 while being guided by the roller 213. The configuration of the first housing 201, the second housing 202, and the display 203 of FIG. 4 may be the same as or similar in whole or part to the configuration of the first housing 201, the second housing 202, and the display 203 of FIGS. 2 and 3.

According to various embodiments, the first housing 201 may include a first supporting member 211 (e.g., a slide plate). In an embodiment, the first supporting member 211 may be slidably connected to the second housing 202 and may linearly reciprocate in one direction (e.g., the X-axis direction) while being guided by the second housing 202. According to an embodiment, the first supporting member 211 may include the first surface F1. At least a portion of the first display area A1 may be substantially mounted on the first support surface F1 to maintain a flat plate shape. According to an embodiment, the first supporting member 211 may include a metallic material and/or a non-metal material (e.g., polymer). According to an embodiment, the first supporting member 211 may support components (e.g., the battery 289 (e.g., the battery 189 of FIG. 1) and the circuit board 204) of the electronic device 200.

According to various embodiments, the articulated hinge structure 205 may be connected with the first housing 201. For example, the articulated hinge structure 205 may be connected with the first supporting member 211. The articulated hinge structure 205 may move with respect to the second housing 202 as the first housing 201 slides. In the closed state (e.g., FIG. 2), the articulated hinge structure 205 may be substantially accommodated in the second housing 202. According to an embodiment, at least a portion of the articulated hinge structure 205 may move correspond to the roller 250.

According to various embodiments, the articulated hinge structure 205 may include a plurality of bars or rods 206. The plurality of rods 206 may extend in a straight line and be disposed parallel to the rotational axis R of the roller 250, and the plurality of rods 214 may be arranged along a direction perpendicular to the rotational axis R (e.g., the direction along which the first housing 201 slides).

According to various embodiments, each rod 206 may pivot around another adjacent rod 206 while remaining parallel with the other adjacent rod 206. According to an embodiment, as the first housing 201 slides, the plurality of rods 206 may be arranged to form a curved shape or may be arranged to form a planar shape. For example, as the first housing 201 slides, a portion of the articulated hinge structure 205 facing the roller 250 may form a curved surface, and another portion of the articulated hinge structure 205 may form a plane. According to an embodiment, the second display area A2 of the display 203 may be mounted or supported on the articulated hinge structure 205, and in the open state (e.g., FIG. 3), at least a portion of the second display area A2, along with the first display area A1, may be exposed to the outside of the second housing 202. In the state in which the second display area A2 is exposed to the outside of the second housing 202, the articulated hinge structure 205 may substantially form a flat surface, thereby supporting or maintaining the second display area A2 in the flat state. According to an embodiment, the articulated hinge structure 205 may be replaced with a bendable integral supporting member (not shown).

According to various embodiments, the roller 250 may be disposed in the first housing 201. For example, the roller 250 may be rotatably mounted to one edge of the first supporting member 211 of the first housing 201. According to an embodiment, the roller 250 may guide the rotation of the second display area A2 while rotating around the rotation axis R.

According to various embodiments, the electronic device 200 may include a speaker module 260. According to an embodiment, the speaker module 260 may be disposed on the second housing 202. The configuration of the speaker module 260 of FIG. 4 may be the same as or similar in whole or part to the configuration of the audio module 170 of FIG. 1.

According to various embodiments, the second housing 202 may include a third plate 223 (e.g., the rear plate). According to an embodiment, the third plate 223 may substantially form at least a portion of the exterior of the second housing 202 or the electronic device 200. For example, the third plate 223 may be coupled to the outer surface of the second supporting member 221. According to an embodiment, the third plate 223 may be integrally formed with the second supporting member 221. According to an embodiment, the third plate 223 may provide a decorative effect on the exterior of the electronic device 200. The second supporting member 221 may be formed of at least one of a metal or a polymer, and the third plate 223 may be formed of at least one of metal, glass, synthetic resin or ceramic. According to an embodiment, the second supporting member 221 and/or the third plate 223 may be formed of a material that transmits light at least partially (e.g., the auxiliary display area). For example, in a state in which a portion of the display 203 (e.g., the second display area A2) is accommodated in the electronic device 200, the electronic device 200 may output visual information using the second display area A2. The auxiliary display area may be a portion of the second supporting member 221 and/or the third plate 223 where the display 203 accommodated in the second housing 202 is positioned.

Figure 5A:
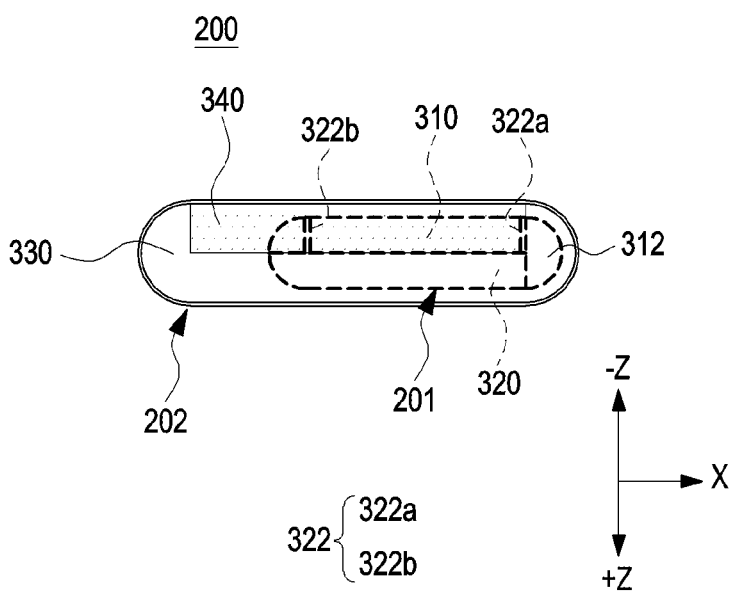
FIG. 5A is a diagram illustrating a side view of an electronic device in a closed state according to various embodiments.
Figure 5B:
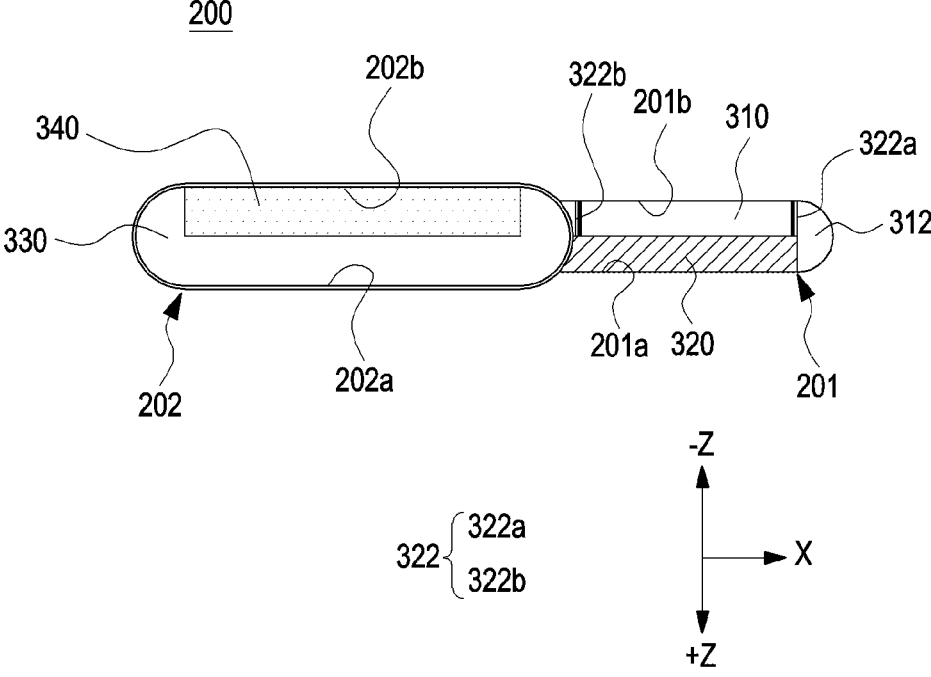
FIG. 5B is a diagram illustrating a side view of an electronic device in an open state according to various embodiments.

FIG. 5A is a diagram illustrating a side view of an electronic device in a closed state according to various embodiments, and FIG. 5B is a diagram illustrating a side view of an electronic device in an open state according to various embodiments.

Referring to FIGS. 5A and 5B, an electronic device 200 may include a first housing 201 including a first metal area 310 and a first non-metal area 320 and a second housing 202 including a second metal area 330 and a second non-metal area 340. The configuration of the first housing 201 and the second housing 202 of FIGS. 5A and 5B may be the same as or similar in whole or part to the configuration of the first housing 201 and the second housing 202 of FIGS. 2 and 4.

According to various embodiments, the first metal area 310 and the first non-metal area 320 may form at least a portion of the exterior of the first housing 201. For example, the first metal area 310 and the first non-metal area 320 may be positioned in the first sidewall (e.g., the 1-1th sidewall 211*a* and/or the 1-2th sidewall 211*b* of FIG. 3) of the first housing 201. In an embodiment, in the opened state (e.g., FIG. 5B) of the electronic device 200, the first metal area 310 and the first non-metal area 320 may be visually exposed to the outside of the electronic device 200 and, in the closed state (e.g., FIG. 5A) of the electronic device 200, the first metal area 310 and the first non-metal area 320 may face the second housing 202. For example, the size of the area where the first metal area 310 and the first non-metal area 320 face the second housing 202 may be larger in the closed state (e.g., FIG. 5A) of the electronic device 200 than in the opened state (e.g., FIG. 5B).

According to various embodiments, at least a portion of the first metal area 310 may operate as an antenna radiator. For example, the first metal area 310 of the first housing 201 may be electrically connected with the communication module (e.g., the communication module 190 of FIG. 1), and the communication module 190 may transmit signals to an external electronic device or receive signals from the external electronic device using at least a portion of the first metal area 310. According to an embodiment, the configuration of the first metal area 310 may be the same as or similar in whole or part to the configuration of the antenna module 197 of FIG. 1. According to an embodiment, the first metal area 310 may include at least one of stainless steel or aluminum.

According to various embodiments, the first side surface (e.g., the 1-1th sidewall 211*a* of FIG. 4) of the first housing 201 may include the first non-metal area 320 and/or the first metal area 310. For example, the first non-metal area 320 may be positioned in the +Z direction of the first metal area 310. For example, the first metal area 310 may be positioned adjacent to the first rear surface 201*b* of the first housing 301, and the first non-metal area 320 may be positioned adjacent to the first front surface 201*a* of the first housing 301. According to an embodiment, the first non-metal area 320 may be formed of substantially a non-conductive material (e.g., resin). For example, the first non-metal area 320 may be interpreted as a first resin area and may include at least one of polycarbonate or polyamide. According to an embodiment, the first non-metal area 320 may be formed through injection molding.

According to various embodiments, the first housing 201 may include a side bezel structure 312. According to an embodiment, the side bezel structure 312 may form at least a portion of the edge of the first housing 301. For example, the side bezel structure 312 may form at least a portion of the 1-1th sidewall (e.g., the 1-1th sidewall 211*a* of FIG. 3) of the first housing 201.

According to various embodiments, the first housing 201 may include a first insulating structure 322. According to an embodiment, the first insulating structure 322 may extend from the first non-metal area 320, and the first insulating structure 322 and the first non-metal area 320 may surround at least a portion of the first metal area 310. According to an embodiment, the first insulating structure 322 may be positioned in a lateral direction (e.g., X-axis direction) with respect to the first metal area 310. According to an embodiment, the first insulating structure 322 may be formed of a substantially non-conductive material. For example, the first insulating structure 322 may include at least one of polycarbonate or polyamide. According to an embodiment, the electronic device 200 may include at least one first insulating structure 322*a* or 322*b*. For example, the first insulating structure 322 may include a 1-1th insulating structure 322*a* and a 1-2th insulating structure 322*b* spaced apart from the 1-1th insulating structure 322*a*. The first metal area 310 may be positioned between the 1-1th insulating structure 322*a* and the 1-2th insulating structure 322*b*.

According to various embodiments, the second metal area 330 and the second non-metal area 340 may form at least a portion of the exterior of the second housing 202. For example, the second metal area 330 and the second non-metal area 340 may be positioned in the second sidewall (e.g., the 2-1th sidewall 221*a* and/or the 2-2th sidewall 221*a* of FIG. 3) of the second housing 202. According to an embodiment, in the closed state (e.g., FIG. 5A) of the electronic device 200, the second metal area 330 and the second non-metal area 340 may cover at least a portion (e.g., the first side surface (e.g., the 1-1th sidewall 211*a* of FIG. 4) of the first housing 201) of the first housing 201. For example, in the closed state (e.g., FIG. 5A) of the electronic device 200, at least a portion of the second metal area 330 may cover at least a portion of the first non-metal area 320, and at least a portion of the second non-metal area 340 may cover at least a portion of the first metal area 310. According to an embodiment, as a portion (e.g., the second metal area 330) of the second housing 202 is formed of metal, the rigidity of the second housing 202 may increase. According to an embodiment, the second metal area 330 may include at least one of stainless steel or aluminum.

According to various embodiments, the second non-metal area 340 may be positioned in the +Z direction of the second metal area 330. For example, the second metal area 330 may be positioned adjacent to the second front surface 202*a* of the second housing 302, and the second non-metal area 340 may be positioned adjacent to the second rear surface 202*b* of the second housing 202. According to an embodiment, the second non-metal area 320 may be formed of substantially a non-conductive material (e.g., resin). For example, the second non-metal area 320 may be interpreted as a second resin area and may include at least one of polycarbonate or polyamide. According to an embodiment, the second non-metal area 340 may be formed through injection molding.

According to various embodiments, the first housing 201 and the second housing 202 may be formed in a complementary symmetric manner. For example, in the closed state of the electronic device 200 or a state (e.g., FIG. 5A) in which the first housing 201 is accommodated in the second housing 202, at least a portion of the first metal area 310 may face at least a portion of the second non-metal area 340, and at least a portion of the first non-metal area 320 may face at least a portion of the second metal area 330. According to an embodiment, in the closed state of the electronic device 200, the signal transmitted from the first metal area 310 may be transferred through the second non-metal area 340 of the second housing 202 to the outside of the electronic device 200, and the signal received by the first metal area 310 may be transferred through the second non-metal area 340 of the second housing 202 to the first metal area 310.

Figure 6:
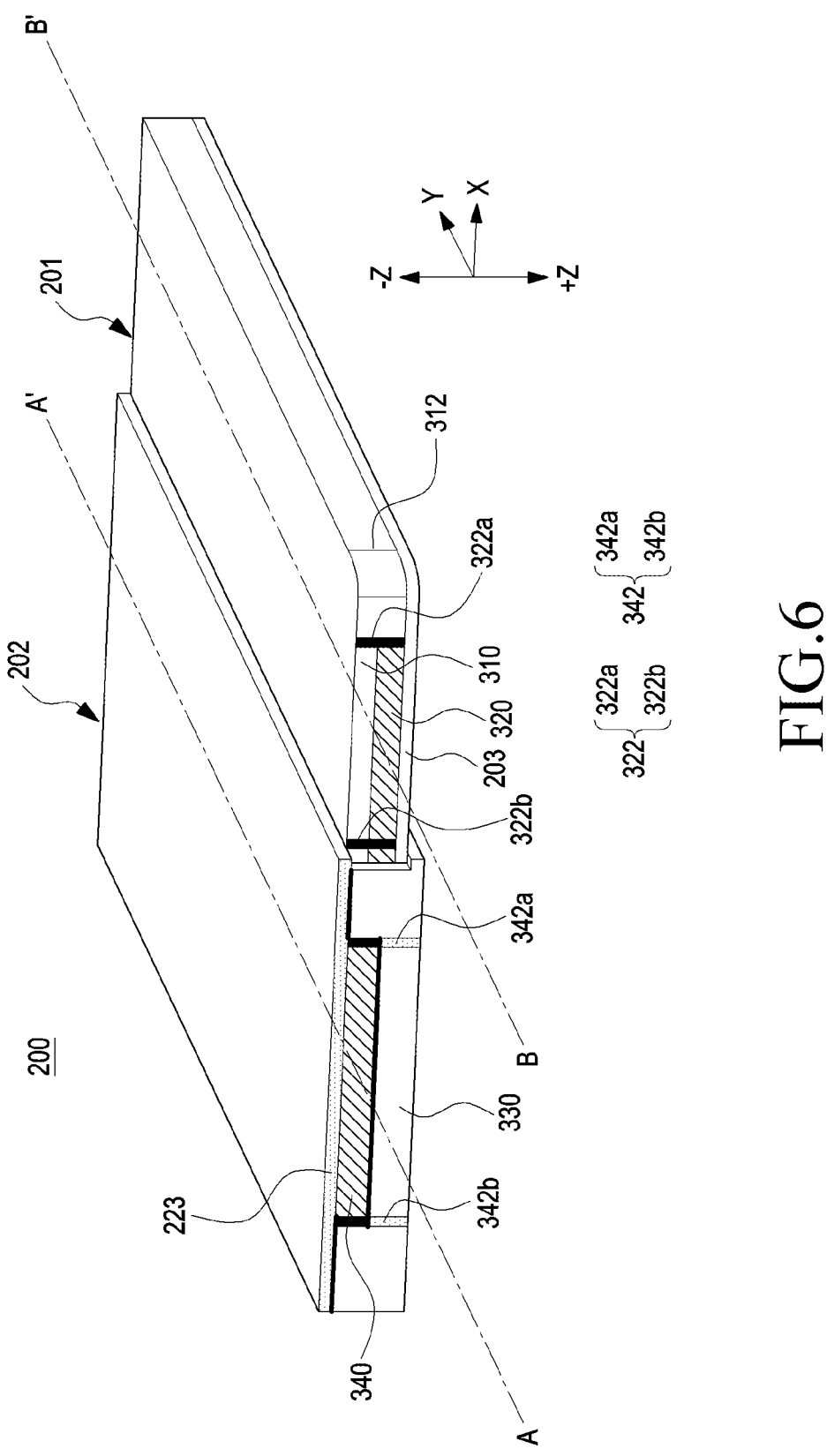
FIG. 6 is a perspective view illustrating an electronic device in an open state, according to various embodiments.

FIG. 6 is a perspective view illustrating an electronic device in an open state, according to various embodiments.

Figure 7A:
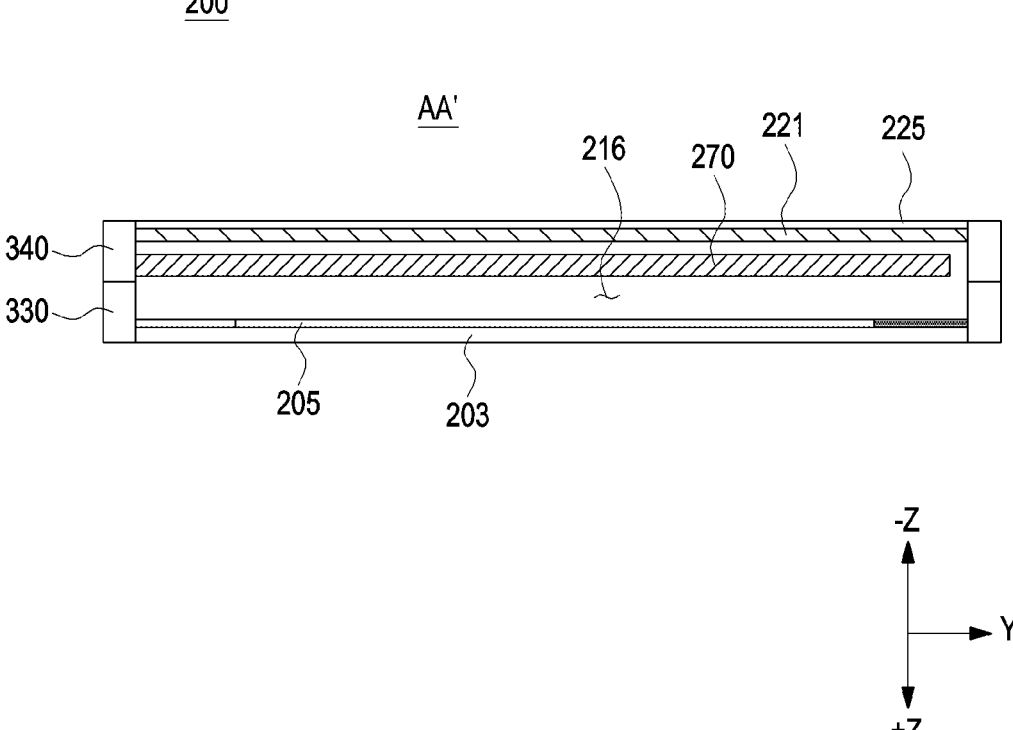
FIG. 7A is a cross-sectional view taken along surface A-A' of FIG. 6 according to various embodiments.
Figure 7B:
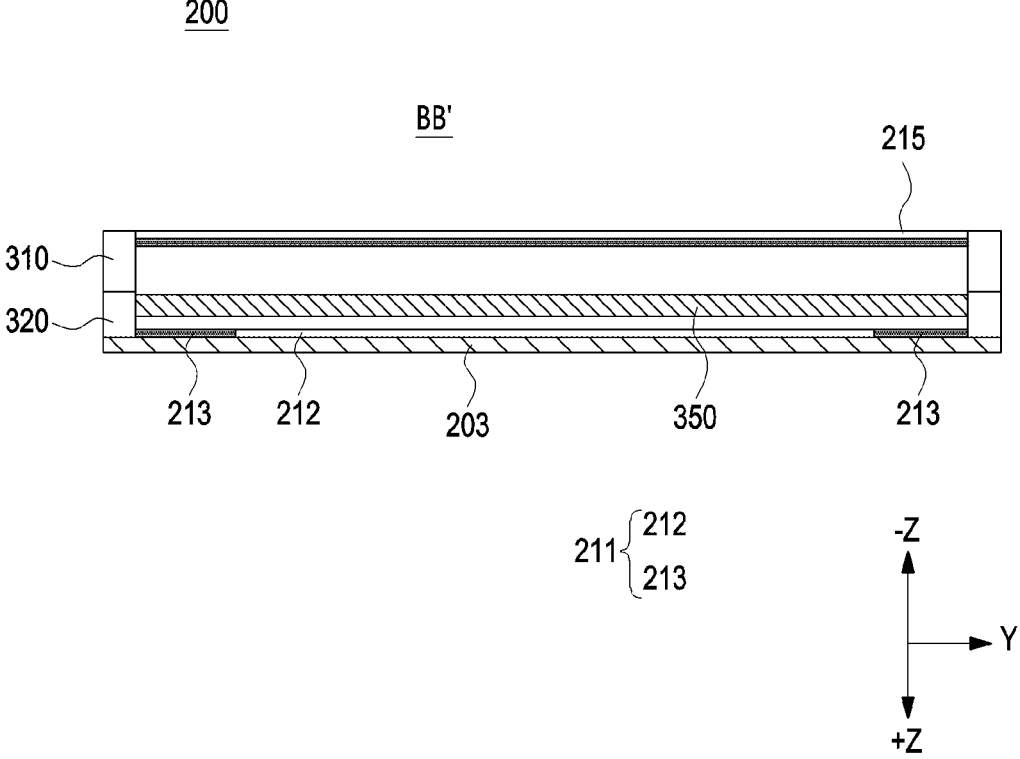
FIG. 7B is a cross-sectional view taken along surface B-B' of FIG. 6 according to various embodiments.
Figure 8:
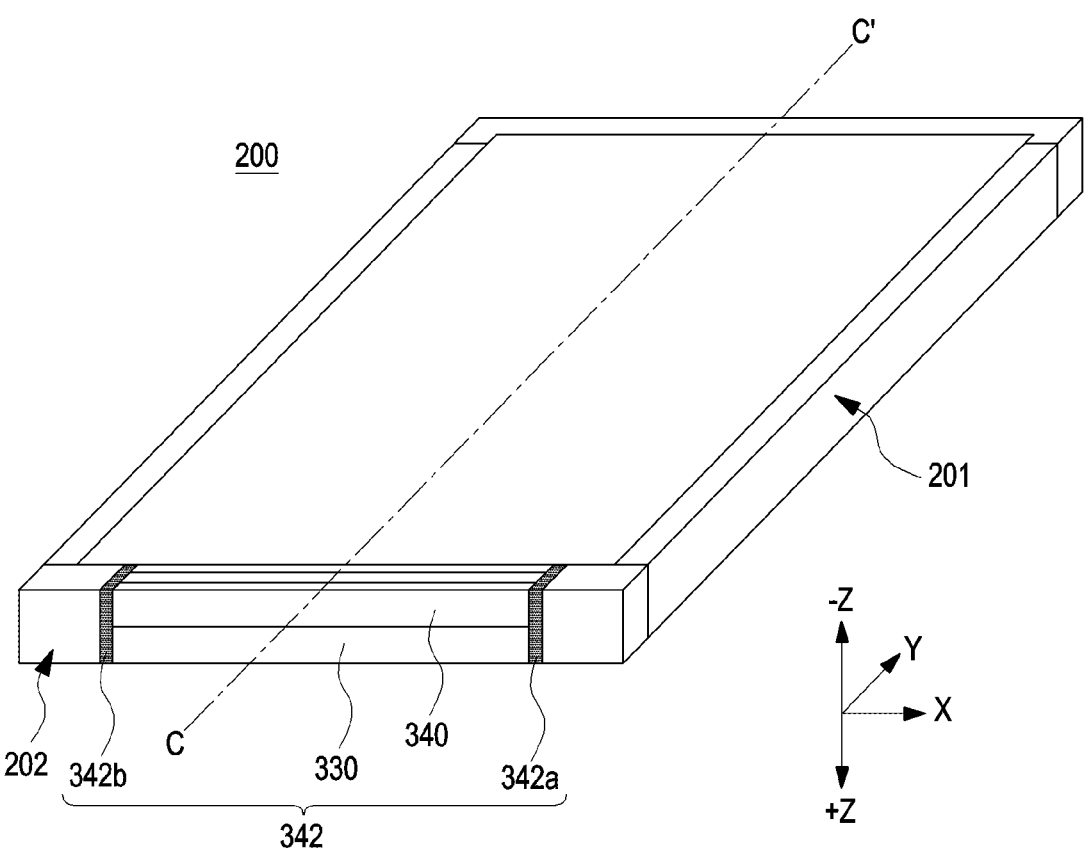
FIG. 8 is a perspective view illustrating an electronic device in a closed state according to various embodiments.
Figure 9:
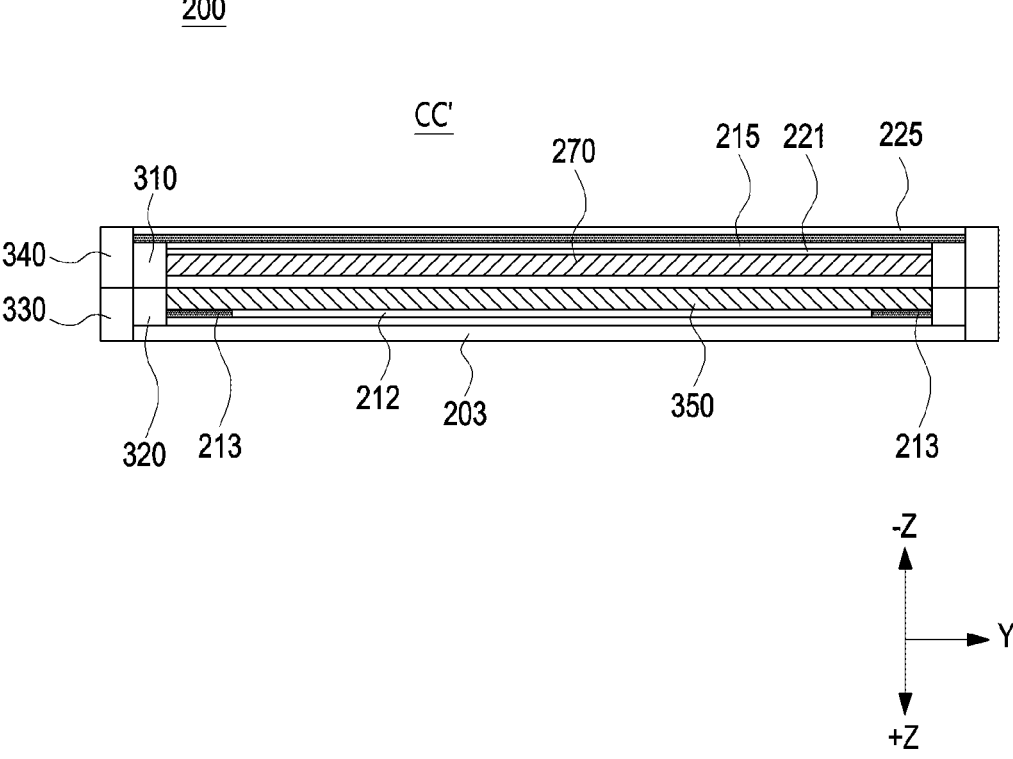
FIG. 9 is a cross-sectional view taken along surface C-C' of FIG. 8 according to various embodiments.

FIG. 7A is a cross-sectional view taken along surface A-A' of FIG. 6, and FIG. 7B is a cross-sectional view taken along surface B-B' of FIG. 6 according to various embodiments. FIG. 8 is a perspective view illustrating an electronic device in a closed state according to various embodiments. FIG. 9 is a cross-sectional view taken along surface C-C' of FIG. 8 according to various embodiments.

Referring to FIGS. 6, 7A, 7B, 8 and/or 9, an electronic device 200 may include a display 203, a first supporting member 211, a second supporting member 221, a first metal area 310, a first non-metal area 320, a second metal area 330, and/or a second non-metal area 340.

The configuration of the display 203, the first supporting member 211, the second supporting member 221, and the articulated hinge structure 205 of FIGS. 6, 7A, 7B, 8 and/or 9 may be the same as or similar in whole or part to the configuration of the display 203, the first supporting member 211, the second supporting member 221, and the articulated hinge structure 205 of FIG. 4. The configuration of the first metal area 310, the first non-metal area 320, the second metal area 330, and the second non-metal area 340 of FIGS. 6, 7A, 7B, 8 and/or 9 may be the same as or similar in whole or part to the configuration of the first metal area 310, the first non-metal area 320, the second metal area 330, and the second non-metal area 340 of FIGS. 5A and 5B.

According to various embodiments, the first housing 201 may reciprocate with respect to the second housing 202 in the width direction (e.g., X-axis direction) of the electronic device 200, and the second metal area 330 and/or the second non-metal area 340 of the second housing 202 may overlap the first metal area 310 and/or the first non-metal area 320 of the first housing 201. According to an embodiment, the second housing 202 may receive at least a portion of the first housing 201. For example, when viewed in the −Y-axis direction, in the closed state of the electronic device 200, the second metal area 330 may overlap at least a portion of the first non-metal area 320, and the second non-metal area 340 may overlap at least a portion of the first metal area 310.

According to various embodiments, the second supporting member 221 may support components (e.g., the display 203 and the printed circuit board 350) of the electronic device 200. According to an embodiment, the first supporting member 211 may include a first area 212 supporting a portion (e.g., the first display area A1 of FIG. 3) of the display 203. According to an embodiment, the first supporting member 211 may include a second area 213 positioned between the first area 212 and the first non-metal area 320. According to an embodiment, the second area 213 may extend from the first area 212 and connect to the first metal area 310 and/or the first non-metal area 320. According to an embodiment, the second area 213, together with the first area 212, may support the display 203. According to an embodiment, the first area 212 may be formed of metal (e.g., stainless steel and/or aluminum), and the second area 213 may be formed of a resin (e.g., polycarbonate and/or polyamide). According to an embodiment, the second area 213 may be interpreted as a slit positioned between the first area 212 and the first non-metal area 320.

According to various embodiments, a portion (e.g., the first display area A1 of FIG. 3) of the display 203 may be disposed on the first non-metal area 320 and/or the first supporting member 211. According to an embodiment, the first non-metal area 320 may be disposed between the first metal area 310 and the portion (e.g., the first display area A1) of the display 203. For example, the first non-metal area 320 may be positioned under (e.g., −Z direction) the display 203 and above (+Z direction) the first metal area 310 and connected with the first supporting member 211. According to an embodiment, as the first metal area 310 is spaced apart from the display 203, the interference of the display 203 with the signal transmitted and/or received by the first metal area 310 may be reduced.

According to various embodiments, a portion (e.g., the second display area A2 of FIG. 3) of the display 203 may be disposed on the articulated hinge structure 205. In the closed state (e.g., FIG. 9) of the electronic device 200, at least a portion of the second display area A2 may be positioned between the articulated hinge structure 205 and the second supporting member 221. According to an embodiment, the second non-metal area 340 may surround at least a portion of the second display area A2.

According to various embodiments, the second housing 202 may include a second insulating structure 342. According to an embodiment, the second insulating structure 342 may extend from the second non-metal area 340, and the second insulating structure 342 and the second non-metal area 340 may surround at least a portion of the second metal area 330. According to an embodiment, the second insulating structure 342 may be positioned in a lateral direction (e.g., X-axis direction) with respect to the second metal area 320. According to an embodiment, the second insulating structure 342 may include a substantially non-conductive material. For example, the second insulating structure 342 may include at least one of polycarbonate or polyamide. According to an embodiment, at least a portion of the second metal area 330 surrounded by the second insulating structure 342 may operate as a radiator of an antenna. At least a portion of the second metal area 330 functioning as an antenna is described with reference to FIG. 10B. According to an embodiment, the electronic device 200 may include at least one second insulating structure 342a and 342b. For example, the second insulating structure 342 may include a 2-1th insulating structure 342a and a 2-2th insulating structure 342b spaced apart from the 2-1th insulating structure 342a. The second metal area 330 may be positioned between the 2-1th insulating structure 342a and the 2-2th insulating structure 342b.

According to various embodiments, the electronic device 200 may include a rear plate 215 and 225 (e.g., the third plate 223 of FIG. 4). According to an embodiment, the rear plate 215 and 225 may include a first rear plate 215 disposed on the first housing 201 and/or a second rear plate 225 disposed on the second housing 202. According to an embodiment, the first rear plate 215 may substantially form at least a portion of the exterior of the first housing 201. According to an embodiment, the first rear plate 215 may be coupled to the outer surface of the first supporting member 211. According to an embodiment, the first rear plate 215 may be integrally formed with the first supporting member 211. According to an embodiment, the second rear plate 225 may substantially form at least a portion of the exterior of the second housing 202. According to an embodiment, the second rear plate 225 may be coupled to the outer surface of the second supporting member 221. For example, the second rear plate 225 may be disposed under (e.g., −Z direction) the sixth support area 224 of the second supporting member 221. According to an embodiment, the second rear plate 225 may be integrally formed with the second supporting member 221.

According to various embodiments, the electronic device 200 may include at least hinge module 270. According to an embodiment, the hinge module 270 may be connected to the first housing 201 and the second housing 202. For example, the hinge module 270 may be connected with the first supporting member 211 and the second supporting member 221. According to an embodiment, the hinge module 270 may transfer an elastic force for guiding the slide movement of the first housing 201 to the first housing 201. For example, the hinge module 270 may include an elastic member (e.g., spring) (not shown) and provide an elastic force to the first housing 201 in the width direction (e.g., X-axis direction) of the electronic device 200 based on a slide movement of the first housing 201.

According to various embodiments, the second housing 202 may include a accommodating space 216. According to an embodiment, the accommodating space 216 may be interpreted as an empty space positioned between the display 203 and a portion (e.g., the fourth support area 222 and the fifth support area 223) of the second supporting member 221. According to an embodiment, in the closed state (e.g., FIG. 9) of the electronic device 200, a portion (e.g., the printed circuit board 350, the first area 212, and the second area 213) of the first housing 201 may be accommodated in the inner space 216.

According to various embodiments, the electronic device 200 may include at least one first metal area 310, at least one first non-metal area 320, at least one second metal area 330, and at least one second non-metal area 340. According to an embodiment (e.g., FIG. 7A, 7B, or 9), the first metal area 310 and the first non-metal area 320 may be positioned in the 1-1th sidewall (e.g., the 1-1th sidewall 211a of FIG. 3) or the 1-2th sidewall (e.g., the 1-2th sidewall 211b of FIG. 3) of the first housing 201, and the second metal area 330 and the second non-metal area 340 may be positioned in the 2-1th sidewall (e.g., the 2-1th sidewall 221a of FIG. 3) or the 2-2th sidewall (e.g., the 2-2th sidewall 221b of FIG. 3) of the second housing 202. According to an embodiment (not shown), the first metal area 310 and the first non-metal area 320 may be positioned in the 1-1th sidewall (e.g., the 1-1th sidewall 211a of FIG. 3) and the 1-2th sidewall (e.g., the 1-2th sidewall 211b of FIG. 3) of the first housing 201, and the second metal area 330 and the second non-metal area 340 may be positioned in the 2-1th sidewall (e.g., the 2-1th sidewall 221a of FIG. 3) and the 2-2th sidewall (e.g., the 2-2th sidewall 221b of FIG. 3) of the second housing 202.

Figure 10A:
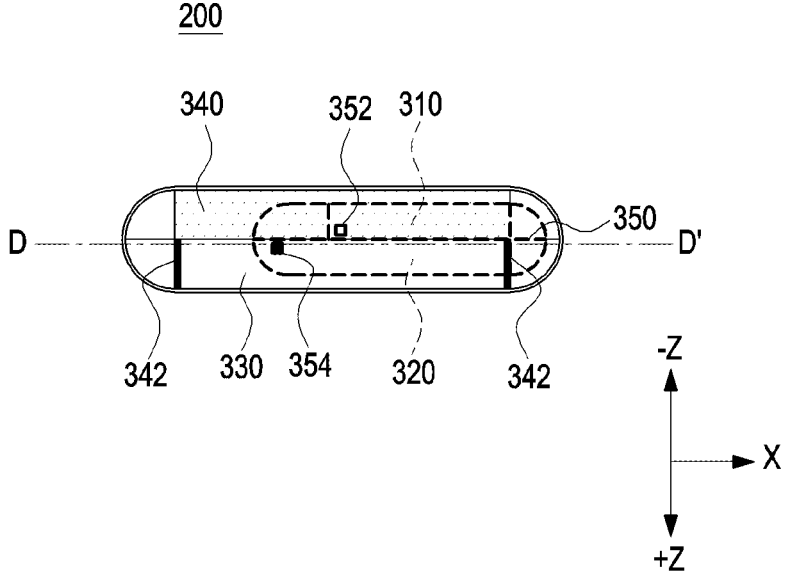
FIG. 10A is a diagram illustrating a side view schematically of an electronic device in a closed state including a printed circuit board according to various embodiments.
Figure 10B:
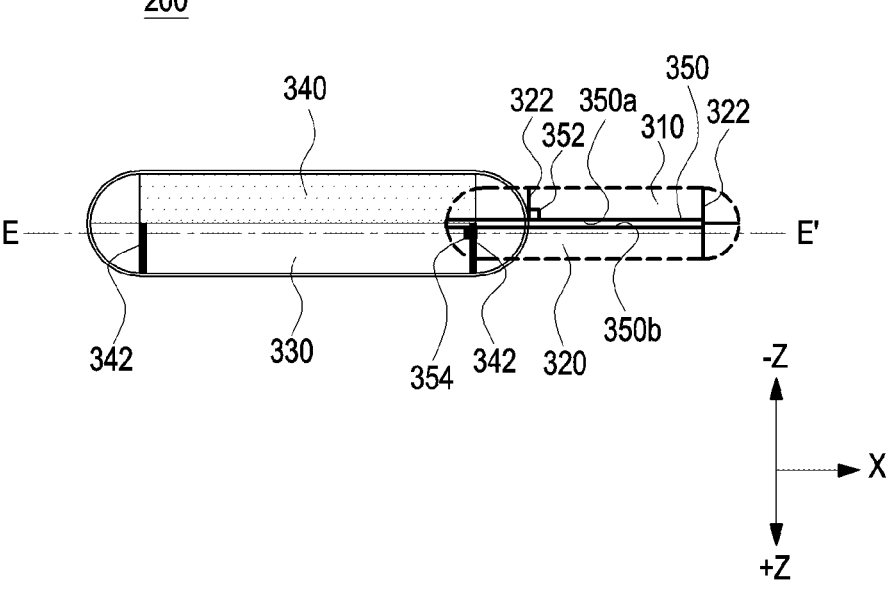
FIG. 10B is a diagram illustrating an electronic device in an open state including a printed circuit board according to various embodiments of the disclosure.
Figure 11A:
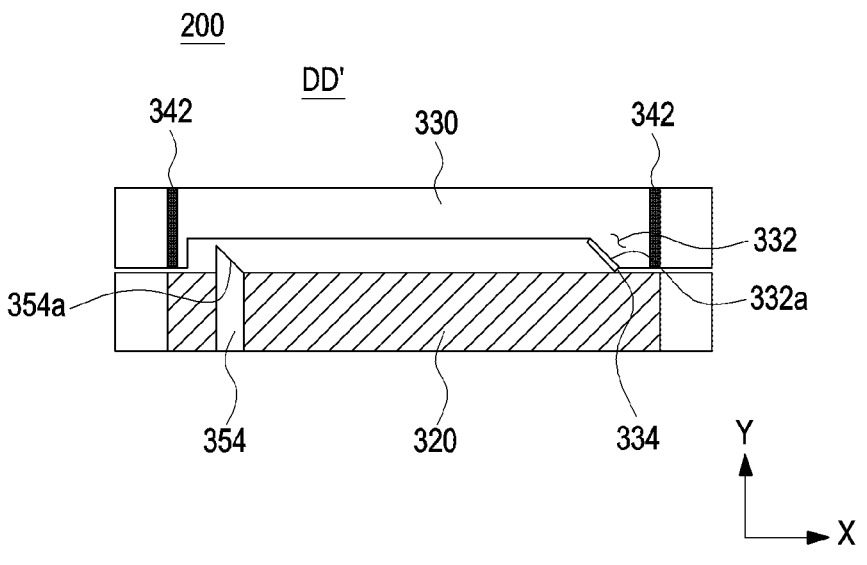
FIGS. 11A and 11B are diagrams illustrating an electrical connection between a second metal area and a second feeding part according to various embodiments.
Figure 11B:
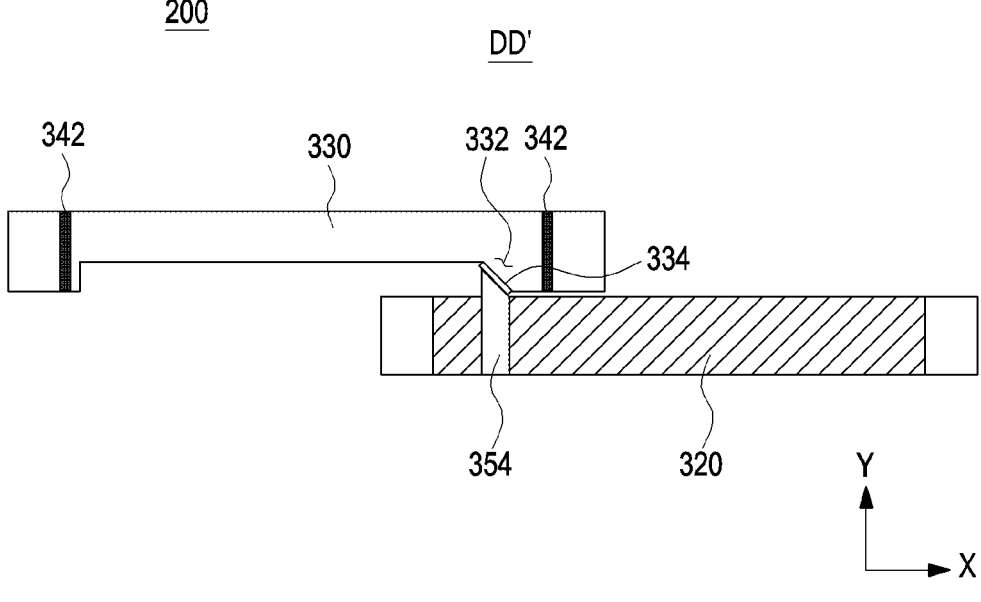
Figure 12:
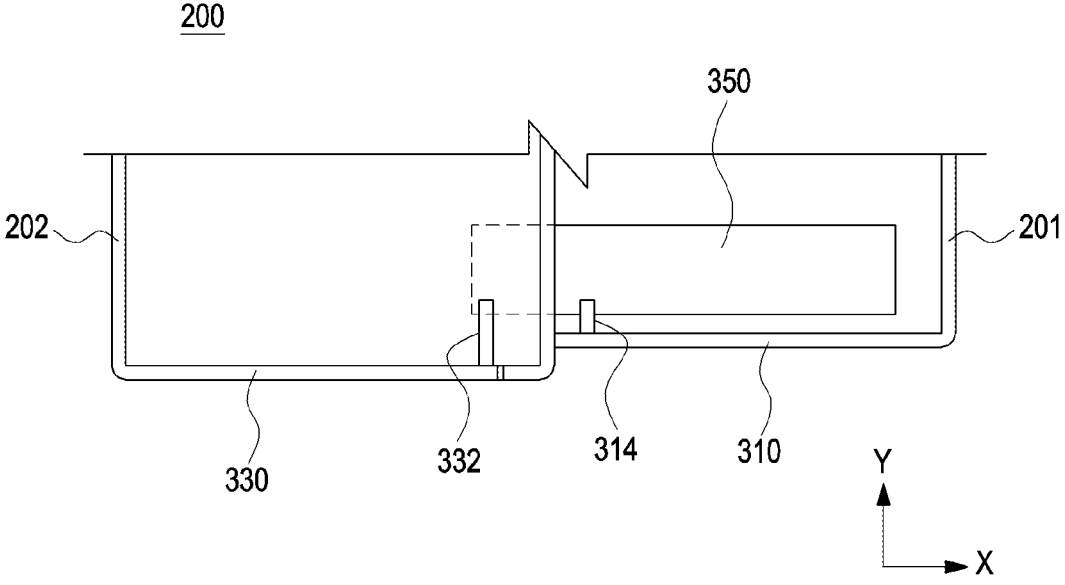
FIG. 12 is a diagram illustrating a front view of an electronic device in an opened state, according to various embodiments.

FIG. 10A is a diagram illustrating a side view of an electronic device in a closed including a printed circuit board according to various embodiments, and FIG. 10B is a diagram illustrating a side view of an electronic device in an open state including a printed circuit board according to various embodiments. FIGS. 11A and 11B are diagrams illustrating an electrical connection between a second metal area and a second feeding part according to various embodiments. FIG. 12 is a diagram illustrating a front view of an electronic device in an opened state, according to various embodiments.

Referring to FIGS. 10A, 10B, 11A, 11B, and 12, an electronic device 200 may include a first metal area 310, a first non-metal area 320, a second metal area 330, a second non-metal areas 340, and a printed circuit board 350. The electronic device 200 may use at least one of the first metal area 310 and the second metal area 330 as a radiator of an antenna. The configuration of the first metal area 310, the first non-metal area 320, the second metal area 330, the second non-metal area 340, and the printed circuit board 350 of FIGS. 10A, 10B, 11A, 11B, and/or 12 may be the same as or similar in whole or part to the configuration of the first metal area 310, the first non-metal area 320, the second metal area 330, the second non-metal area 340, and the printed circuit board 350 of FIGS. 6, 7A, 7B, 8, and/or 9.

According to various embodiments, the electronic device 200 may include a printed circuit board 350 electrically connected with the communication module (e.g., the communication module 190 of FIG. 1). According to an embodiment, the printed circuit board 350 may be disposed in the first housing 201. For example, the printed circuit board 350, together with the first housing 201, may slide with respect to the second housing 202.

According to various embodiments, the printed circuit board 350 may include a first feeding part 352 electrically connected with the first metal area 310. According to an embodiment, the first feeding part 352 may transfer electrical signals and/or power to the first metal area 310. For example, the first metal area 310 may receive power from the communication module 190 positioned on the printed circuit board 350 through the first feeding part 352 to transmit/receive wireless signals.

According to various embodiments, the first housing 201 may include a first protrusion area 314 extending from the first metal area 310. The first protrusion area 314 may be electrically connected with the first feeding part 352. For example, the electrical signal transferred from the first feeding part 352 may be transferred through the first protrusion area 314 to the first metal area 310. According to an embodiment, the first metal area 310 may be integrally formed with the first protrusion area 314.

According to various embodiments, the printed circuit board 350 may include a second feeding part 354 to be electrically connected with the second metal area 330. According to an embodiment, the second feeding part 354 may transfer electrical signals and/or power to the second metal area 330. For example, the second metal area 330 may receive power from the communication module 190 through the second feeding part 354 to transmit/receive wireless signals. According to an embodiment, the second feeding part 354 may be electrically connected selectively with the second metal area 330. For example, in the closed state (e.g., FIG. 10A or 11A) of the electronic device 200, the second feeding part 354 may be spaced apart from, and thus not electrically connected with, the second metal area 330. In the opened state (e.g., FIG. 10B or 11B) of the electronic device 200, the second feeding part 354 may be electrically connected with the second metal area 330. According to an embodiment, as the housings 201 and 202 used as an antenna are switched depending on the frequency band, antenna performance may be enhanced. According to an embodiment, in the closed state of the electronic device 200, the communication module 190 may transmit/receive wireless signals using at least a portion of the first metal area 310 and, in the opened state of the electronic device 200, the communication module 190 may transmit/receive wireless signals using at least one of at least a portion of the first metal area 310 or at least a portion of the second metal area 330. As another example (not shown), in the closed state (e.g., FIG. 10A or 11A) of the electronic device 200, the second feeding part 354 may be electrically connected with the second metal area 330 and, in the opened state (e.g., FIG. 10B or 11B) of the electronic device 200, the second feeding part 354 may not be electrically connected with the second metal area 330. According to an embodiment (not shown), the communication module 190 may transmit/receive wireless signals using the first metal area 310 and/or the second metal area 330 in the closed state of the electronic device 200.

According to various embodiments, the first feeding part 352 and the second feeding part 354 may be disposed on different surfaces of the printed circuit board 350. According to an embodiment, the printed circuit board 350 may include a first surface 350a of the printed circuit board 350 and a second surface 350b of the printed circuit board 350 which is opposite to the first surface 350a of the printed circuit board 350. According to an embodiment, the first feeding part 352 may be disposed on the first surface 350a of the printed circuit board 350, and the second feeding part 354 may be disposed on the second surface 350b of the printed circuit board 350. According to an embodiment, the first surface 350a of the printed circuit board 350 may be positioned more adjacent to the first metal area 310 than the second surface 350b of the printed circuit board 350. For example, the first surface 350a of the printed circuit board 350 may face the display (e.g., the display 203 of FIG. 7B, and the second surface 350b of the printed circuit board may face the first rear plate (e.g., the first rear plate 215 of FIG. 7B). According to an embodiment, the first surface 350a of the printed circuit board 350 may be interpreted as a first printed circuit board surface 350a, and the second surface 350b of the printed circuit board may be interpreted as a second printed circuit board surface 350b.

According to various embodiments, at least a portion of the second metal area 330 may operate as an antenna radiator. For example, at least a portion of the second metal area 330 of the second housing 202 may be electrically connected with the communication module (e.g., the communication module 190 of FIG. 2), and the communication module 190 may transmit signals to an external electronic device or receive signals from the external electronic device using at least a portion of the second metal area 330. According to an embodiment, the configuration of the first metal area 330 may be the same as or similar in whole or part to the configuration of the antenna module 197 of FIG. 2.

According to various embodiments, the second housing 202 may include a second protrusion area 332 extending from the second metal area 330. According to an embodiment, the second protrusion area 332 may be connected with the second feeding part 354 based on a slide movement of the first housing 201. For example, in the opened state (e.g., FIG. 10B, 11B, or 12) of the electronic device 200, the electrical signal transferred from the second feeding part 354 may be transferred through the second protrusion area 332 to the second metal area 330. According to an embodiment, the second metal area 330 may be integrally formed with the second protrusion area 332.

According to various embodiments, the electronic device 200 may include a conductive cushioning member 334. According to an embodiment, the conductive cushioning member 334 may contact the second feeding part 354. For example, the conductive cushioning member 334 may form at least a portion of the electrical path between the second feeding part 354 and the second metal area 330. According to an embodiment, in the opened state (e.g., FIG. 10B, 11B, or 12) of the electronic device 200, the second feeding part 354 may contact the conductive cushioning member 334, and the signal generated by the processor (e.g., the processor 120 of FIG. 1) may be transferred through the second feeding part 354 to the second metal area 330.

According to various embodiments, the conductive cushioning member 334 may be disposed on the second metal area 330. For example, the conductive cushioning member 334 may be disposed on the second protrusion area 332 of the second metal area 330. According to an embodiment, the second protrusion area 332 may include a first surface 332a for facing the second feeding part 354. The conductive cushioning member 334 may be disposed on the first surface 332a. According to an embodiment, the first surface 332a may be formed to be inclined with respect to a portion (e.g., the 2-1th sidewall 221a or the 2-2th sidewall 221b of FIG. 3) of the second metal area 330. According to an embodiment, the second feeding part 354 may include a second surface 354a for contacting a portion (e.g., the first surface 332a) of the second metal area 330 and/or the conductive cushioning member 334. According to an embodiment, the second surface 354a may be formed to be inclined with respect to a portion (e.g., the 1-1th sidewall 211a or the 1-2th sidewall 211b of FIG. 3) of a first injection-molded area 320. As another example, the conductive cushioning member 334 may be disposed on the second surface 354a of the second feeding part 354.

According to various embodiments, the conductive cushioning member 334 may reduce impact due to contact between the second feeding part 354 and the second metal area 330. At least a portion of the conductive cushioning member 334 may be compressed by impact (e.g., contact with the second feeding part 354). According to an embodiment, the conductive cushioning member 334 may be a conductive sponge or conductive tape.

According to various embodiments, the processor (e.g., the processor 120 of FIG. 1) may use at least one of the first metal area 310 or the second metal area 330 as an antenna. For example, the electronic device 200 may include a switching circuit (not shown). The processor 120 may adjust the switching circuit to provide power to at least one of the first metal area 310 or the second metal area 330. For example, in the opened state of the electronic device 200, the first metal area 310 may be electrically connected with the communication module (e.g., the communication module 190 of FIG. 1) through the first feeding part 352, and the second metal area 330 may be electrically connected with the communication module 190 through the second feeding part 354. In the opened state of the electronic device 200, the processor 120 may transmit power to at least one of the first feeding part 352 or the second feeding part 354, and at least one of the first metal area 310 or the second metal area may function as a radiator of an antenna. According to an embodiment, the electronic device 200 may transmit or receive signals using the first metal area 310 and the second metal area 330. According to an embodiment, the electronic device 200 may transmit or receive signals using the first metal area 310. According to an embodiment, the electronic device 200 may transmit or receive signals using the second metal area 330.

Figure 13:
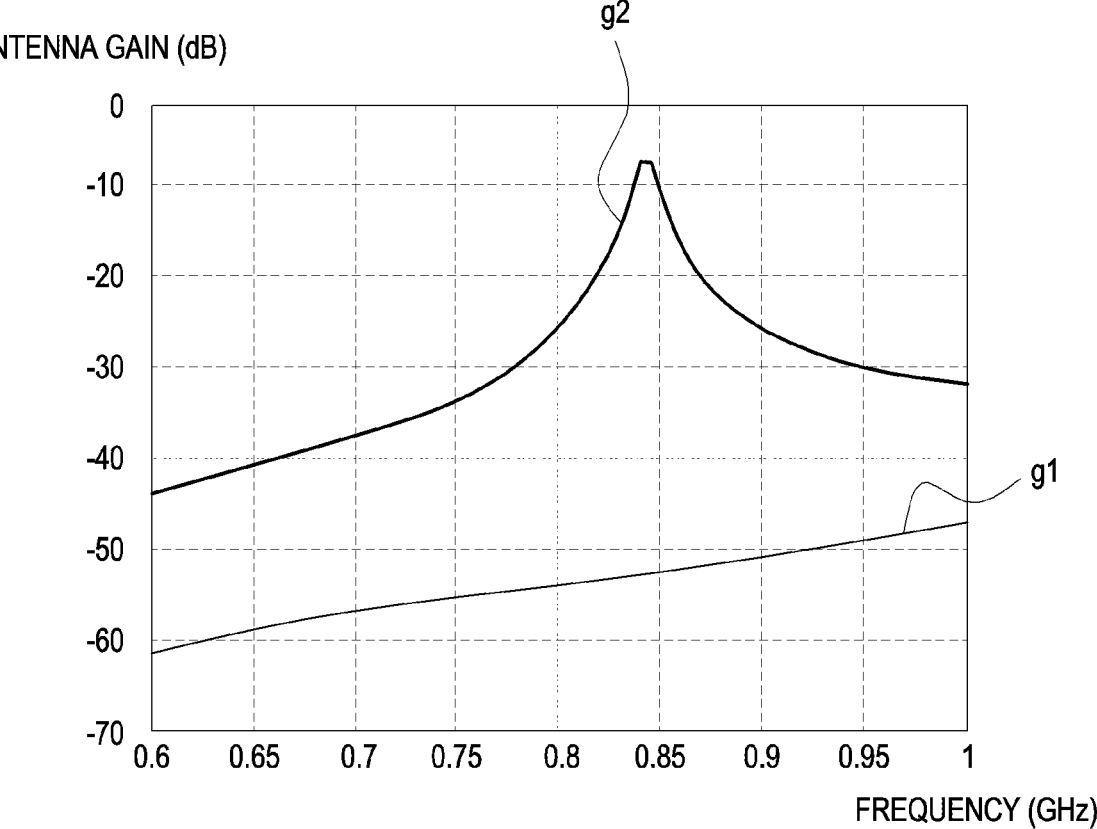
FIG. 13 is a graph illustrating an antenna gain based on frequency according to various embodiments.

FIG. 13 is a graph illustrating an antenna gain based on frequency according to various embodiments.

Referring to FIG. 13, in the closed state (e.g., FIG. 2) of the electronic device 200, the second antenna gain g2 of the electronic device 200, which uses a portion (e.g., the first metal area (e.g., the first metal area 310 of FIG. 5A)) of the first housing (e.g., the first housing 201 of FIG. 5A) and a portion (e.g., the second metal area (e.g., the second metal area 330 of FIG. 5A)) of the second housing (e.g., the second housing 202 of FIG. 5A) as a radiator of an antenna, may be larger than the first antenna gain g1 of an electronic device 200 which uses a portion (e.g., the first metal area (e.g., the first metal area 310 of FIG. 5A)) of the first housing (e.g., the first housing 201 of FIG. 5A) as a radiator of an antenna. The first antenna gain g1 of FIG. 13 may be interpreted as a graph of the antenna gain of an electronic device manufactured according to the prior art, and the second antenna gain g2 may be interpreted as a graph of the antenna gain of the electronic device 200 according to various embodiments of the disclosure in various frequency bands. The antenna gain is the capability of converting antenna feeding power into spatial radiation power and may be interpreted as a measurement value of antenna performance as compared with that of the theoretical antenna. The unit of the antenna gain may be decibel (dB).

According to various embodiments, when the electronic device 200 is closed, if the first metal area (e.g., the first metal area 310 of FIG. 5A) of the first housing (e.g., the first housing 201 of FIG. 2) faces the metal (e.g., the second metal area 330 of FIG. 5A) of the second housing (e.g., the second housing 202 of FIG. 2), the performance (e.g., antenna gain) of the antenna including at least a portion of the first metal area 310 may be reduced due to the metal of the second housing 202.

According to various embodiments, the signal radiated from the first metal area 310 may be radiated through the second non-metal area (e.g., the second non-metal area 340 of FIG. 5A) to the outside of the electronic device 200. According to an embodiment, the second antenna gain g2 of the electronic device 200 including the first metal area 310 and the second non-metal area 340 facing the first metal area 310 in a designated frequency band (e.g., 0.6 GHz to 1 GHz) may be larger than the first antenna gain g1 of an electronic device (not shown) not including a resin material facing the first metal area 310.

Figure 14A:
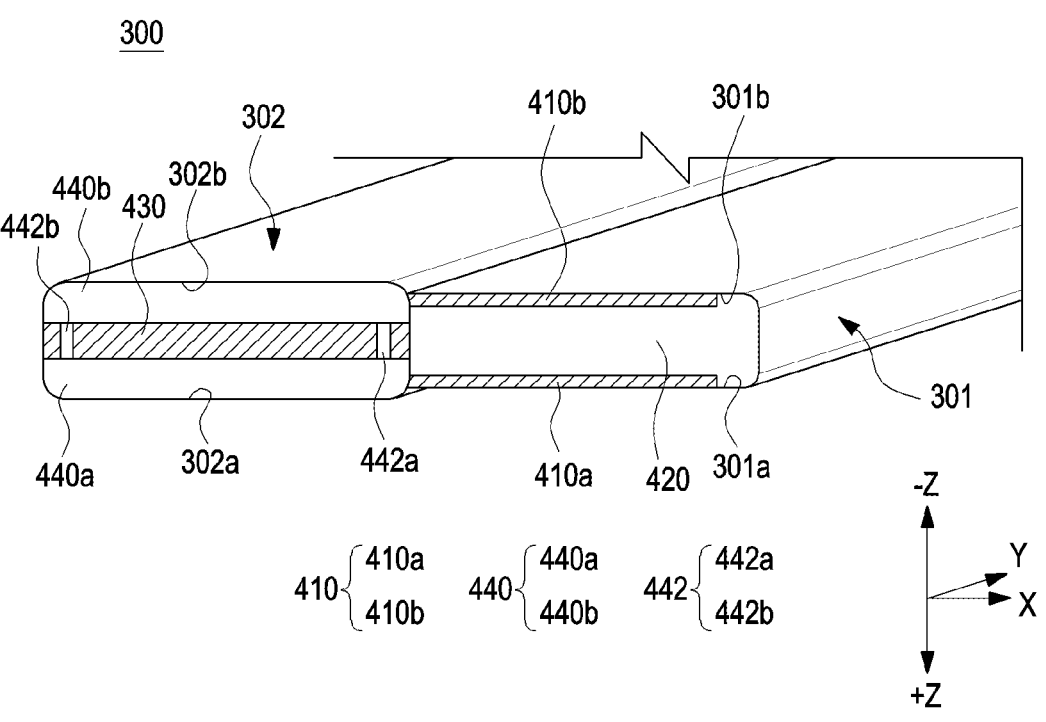
FIG. 14A is a perspective view illustrating an electronic device in an opened state according to various embodiments.
Figure 14B:
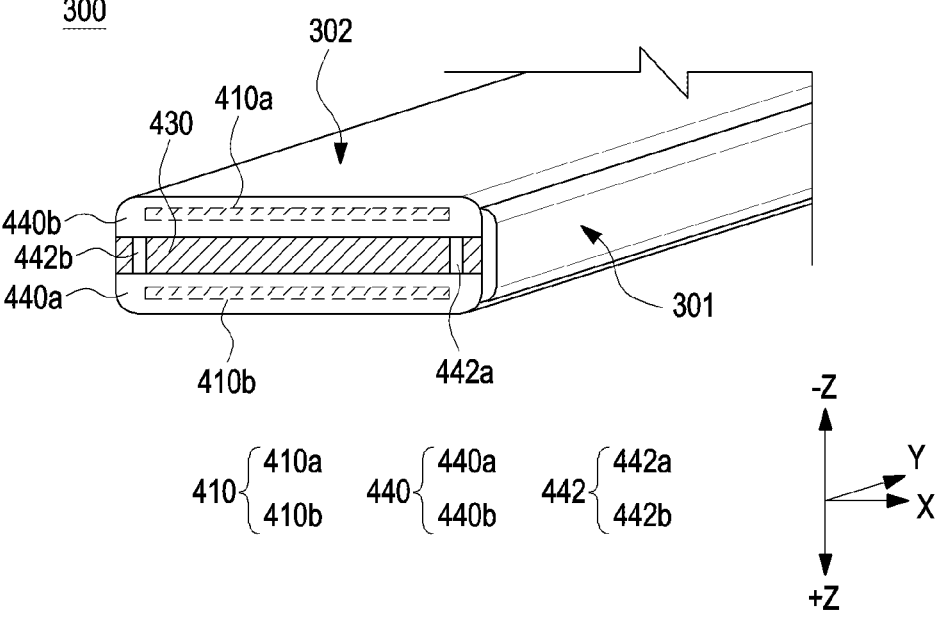
FIG. 14B is a perspective view illustrating an electronic device in a closed state according to various embodiments.

FIG. 14A is a perspective view illustrating an electronic device in an opened state according to various embodiments, and FIG. 14B is a perspective view illustrating an electronic device in a closed state according to various embodiments.

Referring to FIGS. 14A and 14B, an electronic device 300 may include a first housing 301, a second housing 302, a first metal area 410, a first non-metal area 420, a second metal area 430, and a second non-metal area 440. The configuration of the electronic device 300, the first housing 301, the second housing 302, the first metal area 410, the first non-metal area 420, the second metal area 430, and the second non-metal area 440 of FIGS. 14A and 14B may be the same as or similar in whole or part to the configuration of the electronic device 200, the first housing 201, the second housing 202, the first metal area 310, the first non-metal area 320, the second metal area 330, and the second non-metal area 340 of FIGS. 5A and 5B.

According to various embodiments, the first metal area 410 may include a 1-1th metal area 410a positioned adjacent to the first front surface 301a of the first housing 301 and a 1-2th metal area 410b positioned adjacent to the first rear surface 301b of the first housing 301. According to an embodiment, at least a portion of the first non-metal area 420 may be positioned between the 1-1th metal area 410a and the 1-2th metal area 410b.

According to various embodiments, the second non-metal area 440 may include a 2-1th non-metal area 440a positioned adjacent to the second front surface 302a of the second housing 302 and a 2-2th non-metal area 440b positioned adjacent to the second rear surface 302b of the second housing 302. According to an embodiment, at least a portion of the second metal area 430 may be positioned between the 2-1th non-metal area 440a and the 2-2th non-metal area 440b. According to an embodiment, in the closed state (e.g., FIG. 14B) of the electronic device 300, at least a portion of the 1-1th metal area 410a may face at least a portion of the 2-1th non-metal area 440a, at least a portion of the 1-2th metal area 410b may face at least a portion of the 2-2th non-metal area 440b, and at least a portion of the first non-metal area 420 may face at least a portion of the second metal area 430.

According to various embodiments, the electronic device 300 may include at least one third insulating structure 442.

For example, the third insulating structure 442 may include a 3-1th insulating structure 442a and a 3-2th insulating structure 442b. At least a portion of the third metal area 430 may be positioned between the 3-1th insulating structure 442a and the 3-2th insulating structure 442b. According to an embodiment, the configuration of the third insulating structure 442 may be the same as or similar in whole or part to the configuration of the second insulating structure 342 of FIG. 6.

Figure 15A:
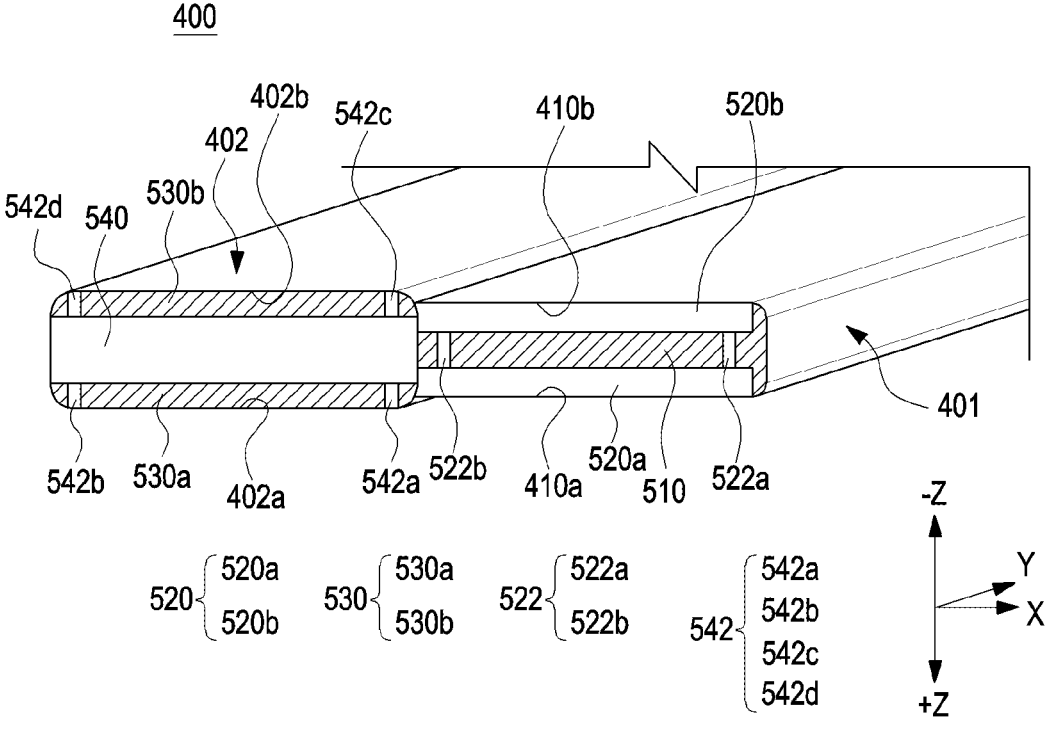
FIG. 15A is a perspective view illustrating an electronic device in an opened state according to various embodiments.
Figure 15B:
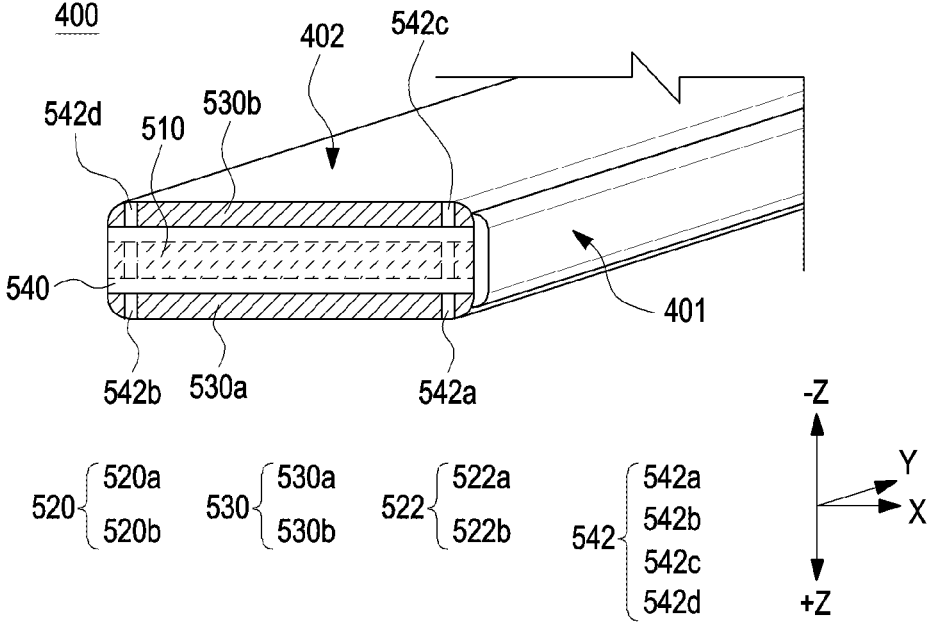
FIG. 15B is a perspective view illustrating an electronic device in a closed state according to various embodiments.

FIG. 15A is a perspective view illustrating an electronic device in an opened state according to various embodiments, and FIG. 15B is a perspective view illustrating an electronic device in a closed state according to various embodiments.

Referring to FIGS. 15A and 15B, an electronic device 400 may include a first housing 401, a second housing 402, a first metal area 510, a first non-metal area 520, a second metal area 530, and a second non-metal area 540. The configuration of the electronic device 400, the first housing 401, the second housing 402, the first metal area 510, the first non-metal area 520, the second metal area 530, and the second non-metal area 540 of FIGS. 15A and 15B may be the same as or similar in whole or part to the configuration of the electronic device 200, the first housing 201, the second housing 202, the first metal area 310, the first non-metal area 320, the second metal area 330, and the second non-metal area 340 of FIGS. 5A and 5B.

According to various embodiments, the first non-metal area 520 may include a 1-1th non-metal area 520a positioned adjacent to the first front surface 401a of the first housing 401 and a 1-2th non-metal area 520b positioned adjacent to the first rear surface 401b of the first housing 401. According to an embodiment, at least a portion of the first metal area 510 may be positioned between the 2-1th non-metal area 520a and the 1-2th non-metal area 520b.

According to various embodiments, the second metal area 530 may include a 2-1th metal area 530a positioned adjacent to the second front surface 402a of the second housing 402 and a 2-2th metal area 530b positioned adjacent to the second rear surface 402b of the second housing 402. According to an embodiment, at least a portion of the second non-metal area 540 may be positioned between the 2-1th metal area 530a and the 2-2th metal area 530b. According to an embodiment, in the closed state (e.g., FIG. 15B) of the electronic device 400, at least a portion of the first metal area 510 may face at least a portion of the second non-metal area 520a, at least a portion of the 1-1th non-metal area 520a may face at least a portion of the 2-1th metal area 530a, and at least a portion of the 1-2th non-metal area 520b may face at least a portion of the 2-2th metal area 530b.

According to various embodiments, the electronic device 400 may include at least one fourth insulating structure 522. For example, the fourth insulating structure 522 may include a 4-1th insulating structure 522a and a 4-2th insulating structure 522b spaced apart from the 4-1th insulating structure 522a. At least a portion of the first metal area 510 may be positioned between the 4-1th insulating structure 522a and the 4-2th insulating structure 522b. According to an embodiment, the configuration of the fourth insulating structure 522 may be the same as or similar in whole or part to the configuration of the first insulating structure 322 of FIG. 6.

According to various embodiments, the electronic device 400 may include at least one fifth insulating structure 542. For example, the fifth insulating structure 542 may include a 5-1th insulating structure 542a, a 5-2th insulating structure 542b, a 5-3th insulating structure 542c, and/or a 5-4th insulating structure 542d spaced apart from each other. At least a portion of the 2-1th metal area 530*a* may be positioned between the 5-1th insulating structure 542*a* and the 5-2th insulating structure 542*b*. At least a portion of the 2-2th metal area 530*b* may be positioned between the 5-3th insulating structure 542*c* and the 5-4th insulating structure 542*d*. According to an embodiment, the configuration of the fifth insulating structure 542 may be the same as or similar in whole or part to the configuration of the second insulating structure 342 of FIG. 6.

According to various example embodiments of the disclosure, an electronic device (e.g., the electronic device 200 of FIG. 2) may comprise: a first housing (e.g., the first housing 201 of FIG. 3) including a first metal area (e.g., the first metal area 310 of FIG. 5B) and a first non-metal area (e.g., the first non-metal area 320 of FIG. 5B), a second housing (e.g., the second housing 202 of FIG. 3) configured to accommodate at least a portion of the first housing and to guide a slide movement of the first housing, the second housing including a second metal area (e.g., the second metal area 330 of FIG. 5B) and a second non-metal area (e.g., the second non-metal area 340 of FIG. 5B), and a display (e.g., the display 203 of FIG. 3) including a first display area (e.g., the first display area A1 of FIG. 3) connected with the first housing and a second display area (e.g., the second display area A2 of FIG. 3) extending from the first display area. The first metal area may face at least a portion of the second non-metal area, and the first non-metal area may face at least a portion of the second metal area in a state in which the first housing is accommodated in the second housing.

According to various example embodiments, the electronic device may further comprise: a communication module comprising communication circuitry (e.g., the communication module 190 of FIG. 1) electrically connected with the first metal area and configured to transmit and/or receive a signal using the first metal area.

According to various example embodiments, the electronic device may further comprise: a printed circuit board (e.g., the printed circuit board 350 of FIG. 10B) disposed in the first housing and including a first feeding part (e.g., the first feeding part 352 of FIG. 10B) electrically connected with the first metal area and a second feeding part (e.g., the second feeding part 354 of FIG. 10B) configured to be electrically connected with the second metal area.

According to various example embodiments, the electronic device may further comprise a processor (e.g., the processor 120 of FIG. 1) configured to control the electronic device to transmit power to at least one of the first feeding part or the second feeding part.

According to various example embodiments, the first housing may include a first protrusion area (e.g., the first protrusion area 314 of FIG. 12) extending from the first metal area and connected with the first feeding part, and the second housing may include a second protrusion area (e.g., the second protrusion area 332 of FIG. 12) extending from the second metal area and configured to be electrically connected with the second feeding part.

According to various example embodiments, the second housing may include a conductive cushioning member comprising a compressible material (e.g., the conductive cushioning member 334 of FIG. 11B) disposed on the second metal area and configured to contact the second feeding part.

According to various example embodiments, the printed circuit board may include a first printed circuit board surface (e.g., the first printed circuit board surface 350*a* of FIG. 10B) and a second printed circuit board surface (e.g., the second printed circuit board surface 350*b* of FIG. 10B)

opposite to the first printed circuit board surface. The first feeding part may be disposed on the first printed circuit board surface, and the second feeding part may be disposed on the second printed circuit board surface.

According to various example embodiments, the first non-metal area may be disposed between the first metal area and the first display area.

According to various example embodiments, the first housing may include a first insulating structure comprising an insulating material (e.g., the first insulating structure 322 of FIG. 6) extending from the first non-metal area and surrounding at least a portion of the first metal area.

According to various example embodiments, the second housing may include a second insulating structure comprising an insulating material (e.g., the second insulating structure 342 of FIG. 6) extending from the second non-metal area and surrounding at least a portion of the second metal area.

According to various example embodiments, the second housing may include a first second sidewall (e.g., the 2-1th sidewall 221*a* of FIG. 4), a second second sidewall (e.g., the 2-2th sidewall 221*b* of FIG. 4) opposite to the first second sidewall, and a third second sidewall (e.g., the 2-3th sidewall 221*c* of FIG. 4) extending from the first second sidewall to the second second sidewall, and the first housing may include a first first sidewall (e.g., the 1-1th sidewall 211*a* of FIG. 4) facing the first second sidewall, a second first sidewall (e.g., the 1-2th sidewall 211*b* of FIG. 4) facing the second second sidewall, and a third first sidewall (e.g., the 1-3th sidewall 211*c* of FIG. 4) extending from the first first sidewall to the second first sidewall.

According to various example embodiments, the first metal area and the first non-metal area may be positioned in the first first sidewall and the second first sidewall, and the second metal area and the second non-metal area may be positioned in the first second sidewall and the second second sidewall.

According to various example embodiments, the first metal area and the second metal area may include at least one of stainless steel or aluminum, and the first non-metal area and the second non-metal area include at least one of polycarbonate or polyamide.

According to various example embodiments, the electronic device may further comprise a roller (e.g., the roller 250 of FIG. 4) rotatably mounted on the first housing and configured to guide rotation of the second display area.

According to various example embodiments, the electronic device may further comprise at least one hinge module comprising a hinge (e.g., the hinge module 270 of FIG. 8) connected to the first housing and the second housing.

According to various example embodiments of the disclosure, an electronic device may comprise: a first housing (e.g., the first housing 201 of FIG. 2) including a first metal area (e.g., the first metal area 310 of FIG. 5B) and a first non-metal area (e.g., the first non-metal area 320 of FIG. 5B), a second housing (e.g., the second housing 202 of FIG. 2) configured to accommodate at least a portion of the first housing and to guide a slide movement of the first housing, the second housing including a second metal area (e.g., the second metal area 330 of FIG. 5B) and a second non-metal area (e.g., the second non-metal area 340 of FIG. 5B), a display (e.g., the display 203 of FIG. 3) including a first display area (e.g., the first display area A1 of FIG. 3) connected with the first housing and a second display area (e.g., the second display area A2 of FIG. 3) extending from the first display area, and a communication module comprising communication circuitry (e.g., the communication module 190 of FIG. 1) configured to transmit and/or receive a signal using at least one of the first metal area or the second metal area. At least a portion of the second metal area may be configured to cover at least a portion of the first non-metal area, and at least a portion of the second non-metal area may be configured to cover at least a portion of the first metal area.

While the disclosure has been illustrated and described with reference to various example embodiments, it will be understood that the various example embodiments are intended to be illustrative, not limiting. It will be further understood by those of ordinary skill in the art that an electronic device including an antenna as described above is not limited to the above-described example embodiments and those shown in the drawings, and various changes, modifications, or alterations may be made thereto without departing from the scope of the disclosure, including the appended claims and their equivalents. It will also be understood that any of the embodiment(s) described herein may be used in conjunction with any other embodiment(s) described herein.

What is claimed is:

1. An electronic device, comprising:
a first housing including a first metal area comprising metal, and a first non-metal area, the first metal area and the first non-metal area being at least partially disposed on an exterior surface of the first housing;
a second housing configured to accommodate at least a portion of the first housing and to guide a slide movement of the first housing, the second housing including a second metal area comprising metal and a second non-metal area, the second metal area and the second non-metal area being at least partially disposed on an exterior surface of the second housing; and
a display including a first display area connected with the first housing and a second display area extending from the first display area,
wherein the first metal area faces at least a portion of the second non-metal area, and the first non-metal area faces at least a portion of the second metal area in a state in which the first housing is accommodated in the second housing,
wherein the first and second housings are configured so that a signal transmitted from the first metal area is transferred through the second non-metal area to an outside of the electronic device, and wherein a signal received by the first metal area is transferred through the second non-metal area to the first metal area.

2. The electronic device of claim 1, further comprising a communication module comprising communication circuitry electrically connected with the first metal area and configured to transmit, receive, or transmit and receive the signal using the first metal area.

3. The electronic device of claim 1, further comprising a printed circuit board disposed in the first housing and including a first feeding part electrically connected with the first metal area and a second feeding part configured to be electrically connected with the second metal area.

4. The electronic device of claim 3, further comprising a processor configured to control the electronic device to transmit power to at least one of the first feeding part or the second feeding part.

5. The electronic device of claim 3, wherein the first housing includes a first protrusion area extending from the first metal area and connected with the first feeding part, and
the second housing includes a second protrusion area extending from the second metal area and configured to be electrically connected with the second feeding part.

6. The electronic device of claim 3, wherein the second housing includes a conductive cushioning member comprising a compressible material disposed on the second metal area and configured to contact the second feeding part.

7. The electronic device of claim 3, wherein the printed circuit board includes a first printed circuit board surface and a second printed circuit board surface opposite to the first printed circuit board surface, and wherein the first feeding part is disposed on the first printed circuit board surface, and the second feeding part is disposed on the second printed circuit board surface.

8. The electronic device of claim 1, wherein the first non-metal area is disposed between the first metal area and the first display area.

9. The electronic device of claim 1, wherein the first housing includes a first insulating structure comprising an insulating material extending from the first non-metal area and surrounding at least a portion of the first metal area.

10. The electronic device of claim 1, wherein the second housing includes a second insulating structure comprising an insulating material extending from the second non-metal area and surrounding at least a portion of the second metal area.

11. The electronic device of claim 1, wherein the second housing includes a 2-1th sidewall, a 2-2th sidewall opposite to the 2-1th sidewall, and a 2-3th sidewall extending from the 2-1th sidewall to the 2-2th sidewall, and the first housing includes a 1-1th sidewall facing the 2-1th sidewall, a 1-2th sidewall facing the 2-2th sidewall, and a 1-3th sidewall extending from the 1-1th sidewall to the 1-2th sidewall.

12. The electronic device of claim 11, wherein the first metal area and the first non-metal area are positioned in the 1-1th sidewall and the 1-2th sidewall, and
the second metal area and the second non-metal area are positioned in the 2-1th sidewall and the 2-2th sidewall.

13. The electronic device of claim 1, wherein the first metal area and the second metal area include at least one of stainless steel or aluminum, and
the first non-metal area and the second non-metal area include at least one of polycarbonate or polyamide.

14. The electronic device of claim 1, further comprising a roller rotatably mounted in the first housing and configured to guide rotation of the second display area.

15. The electronic device of claim 1, further comprising at least one hinge module comprising a hinge connected to the first housing and the second housing.

* * * * *